United States Patent [19]
McGrew

[11] 4,272,383
[45] Jun. 9, 1981

[54] METHOD AND APPARATUS FOR EFFECTING SUBSURFACE, CONTROLLED, ACCELERATED CHEMICAL REACTIONS

[76] Inventor: Jay L. McGrew, 12213 Maxwell Hill Rd., Littleton, Colo. 80120

[21] Appl. No.: 109,417

[22] Filed: Jan. 3, 1980

Related U.S. Application Data

[63] Continuation of Ser. No. 887,506, Mar. 17, 1978, abandoned.

[51] Int. Cl.³ ............................ C02F 1/74; C02F 11/08
[52] U.S. Cl. ...................................... 210/741; 60/641 R; 166/302; 210/742; 210/752; 210/761; 210/149; 210/170; 210/187; 210/220
[58] Field of Search .................. 166/61, 302, 256; 210/3, 12, 14, 15, 60, 63 R, 71, 149, 170, 187, 197, 220; 261/29, 76, 121 R; 417/108; 165/45; 60/641

[56] References Cited

U.S. PATENT DOCUMENTS

| | | | |
|---|---|---|---|
| 895,229 | 8/1908 | Beddoes | 210/15 |
| 1,291,130 | 1/1919 | Purchas | 417/108 |
| 2,315,577 | 4/1943 | Bach | 210/12 |
| 2,348,670 | 5/1944 | Woodward | 210/149 X |
| 2,665,249 | 1/1954 | Zimmermann | 210/63 R |
| 2,773,026 | 12/1956 | Cederquist | 210/63 R X |
| 3,060,118 | 10/1962 | Schoeffel | 210/3 |
| 3,160,685 | 12/1964 | Chase | 210/220 X |
| 3,246,761 | 4/1966 | Bryan et al. | 261/121 R X |
| 3,272,740 | 9/1966 | Gitchel et al. | 210/12 X |
| 3,449,247 | 6/1969 | Bauer | 210/63 R |
| 3,464,885 | 9/1969 | Land et al. | 166/61 X |
| 3,606,999 | 9/1971 | Lawless | 210/63 R X |
| 3,804,255 | 4/1974 | Speece | 261/29 X |
| 3,853,759 | 12/1974 | Titmas | 210/63 R |
| 3,858,397 | 1/1975 | Jacoby | 60/641 X |
| 4,042,510 | 8/1977 | Sullins | 210/220 |

OTHER PUBLICATIONS

Moissis et al., *Entrance Effects in a Developing Slug Flow*, 6/1960, Technical Report, No. 18, for the Office of Naval Research.

*Primary Examiner*—Robert H. Spitzer
*Attorney, Agent, or Firm*—Ancel W. Lewis, Jr.

[57] ABSTRACT

A method and apparatus is disclosed for effecting accelerated chemical reactions between reactants at elevated temperatures and pressures including the wet oxidation of materials in waste streams. A reactor has a through pipe that extends down into a cased hole in the earth and back up independent of the hole. A controlled flow of influent fluid with reactants is flowed down the pipe to form a hydrostatic column of fluid that is of sufficient depth to exert a pressure and provide a temperature sufficient to cause reactants to react at an accelerated reaction rate and to achieve the necessary retention time to substantially complete the reaction. Heat is released in the reaction zone to heat the fluid, and the heated fluid is then flowed back up in heat exchange relation to the downflowing fluid. The temperature of the fluid is controlled in the reaction zone by adding heat for start-up and selectively adding or removing heat to maximize the reaction rate and to prevent boiling of the fluid. When a gas is used as a reactant, enlarged gas bubbles are formed at approximately the ground surface level and are pumped down with the influent fluid to cause intense mixing, contacting, and a chemical reaction in the reaction zone to maximize reaction rates and minimize power requirements for pumping.

62 Claims, 28 Drawing Figures

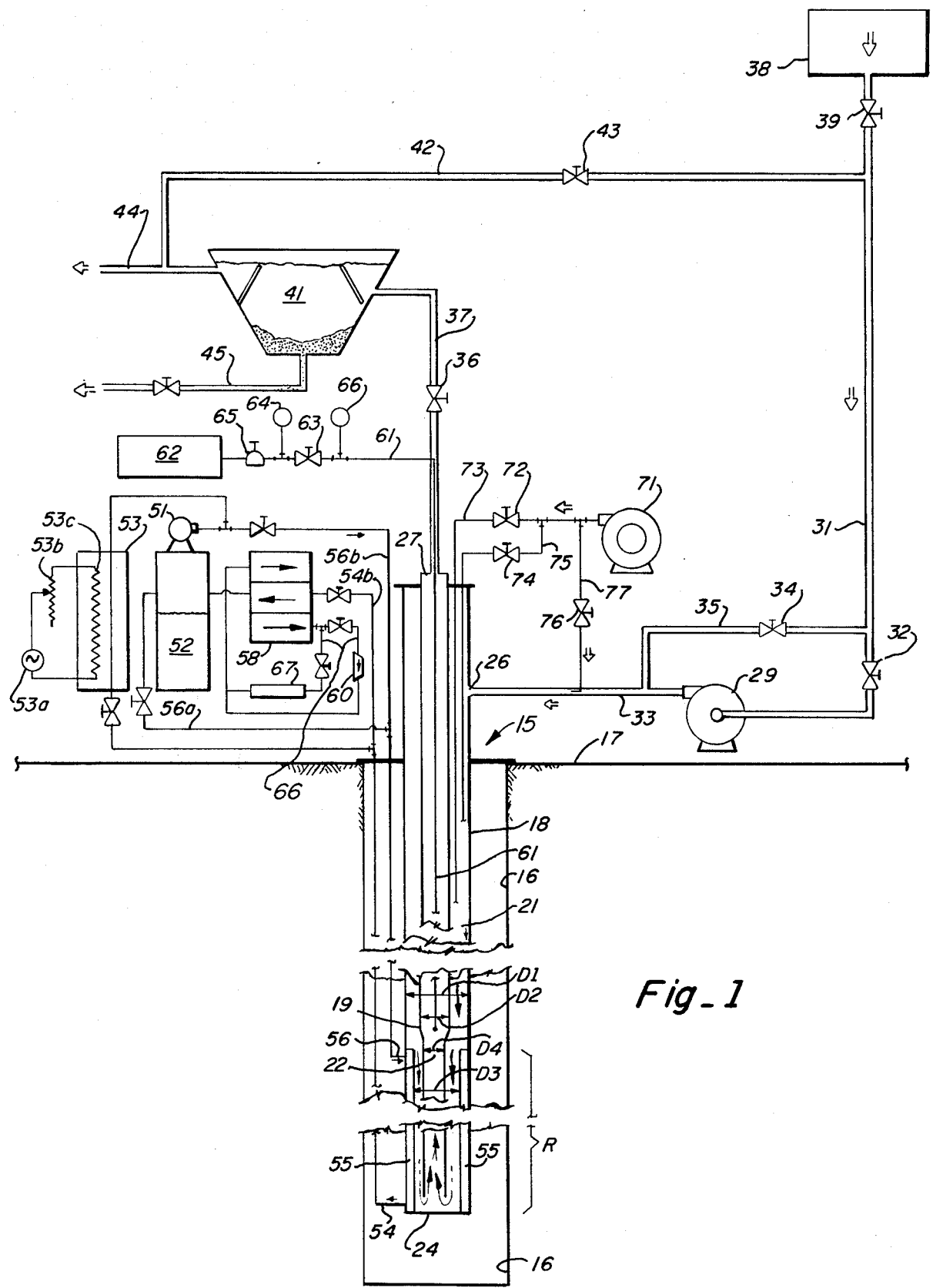
Fig_1

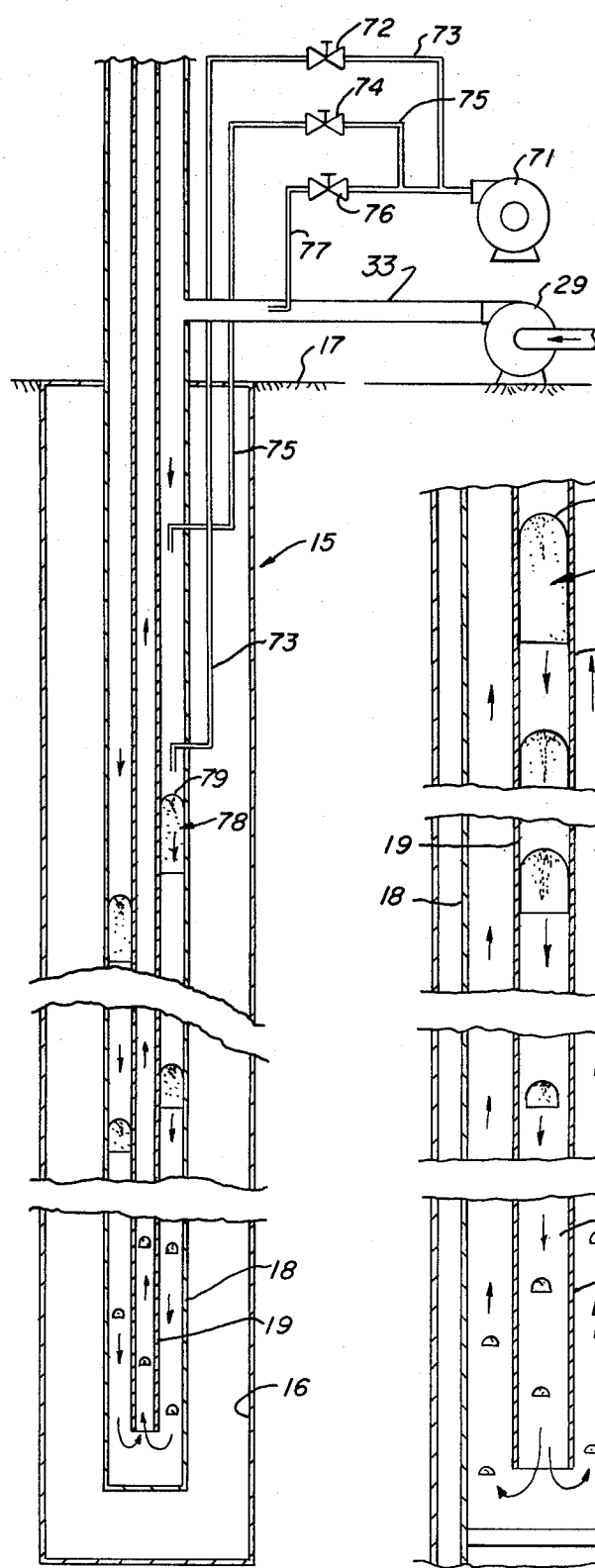
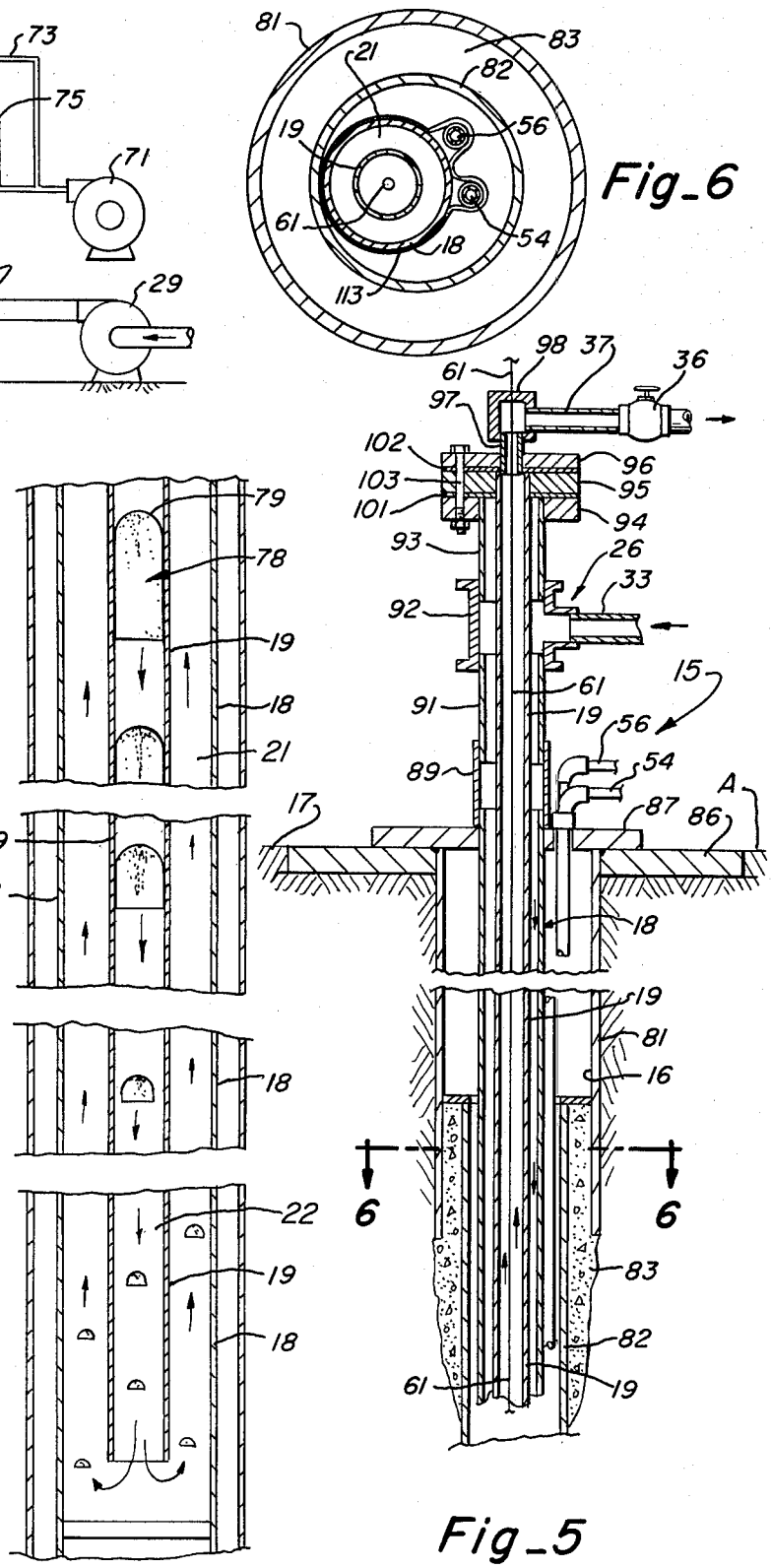
Fig_2  Fig_3  Fig_5  Fig_6

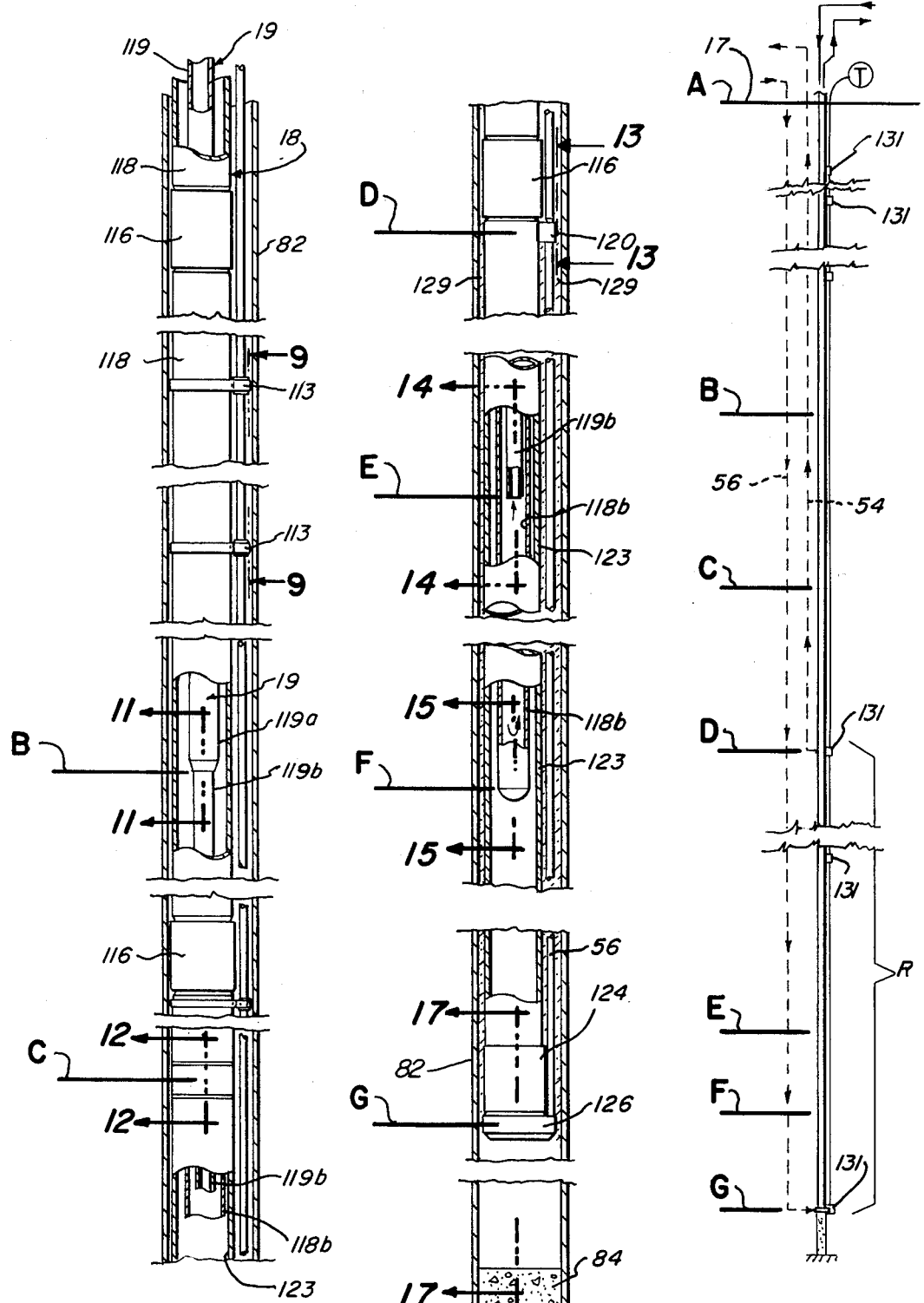

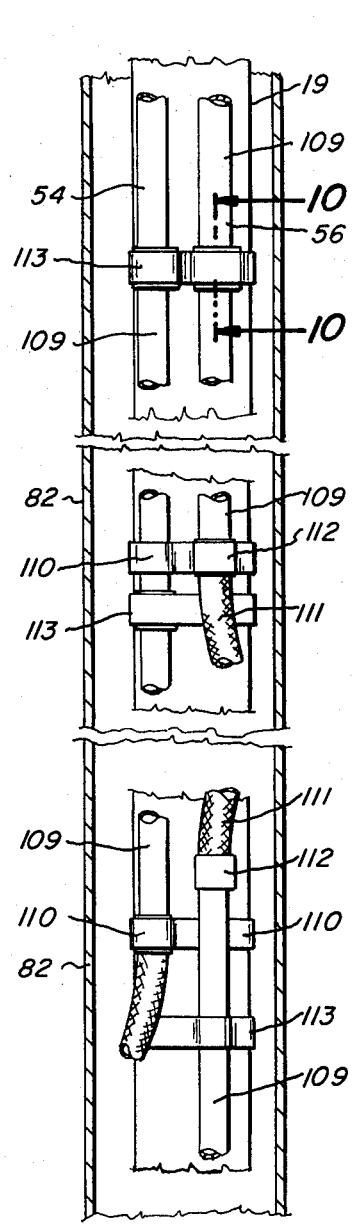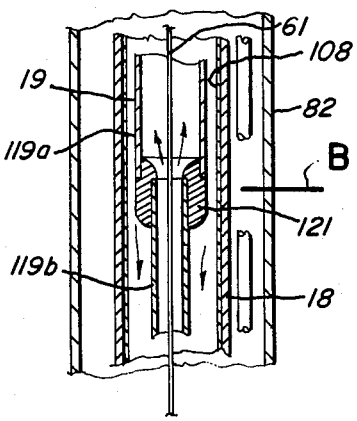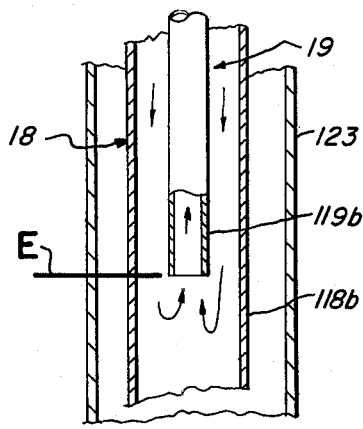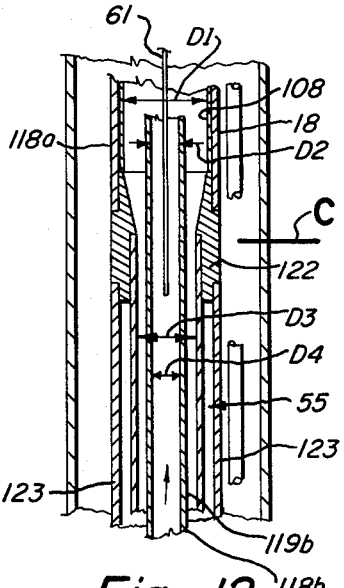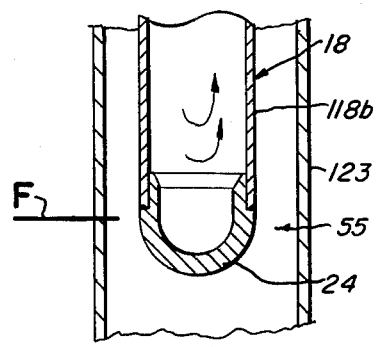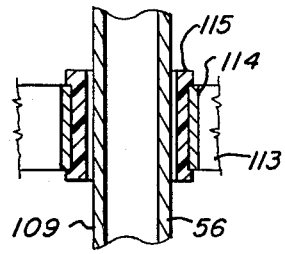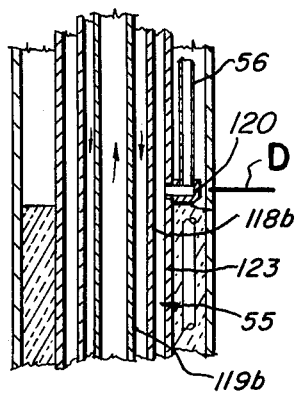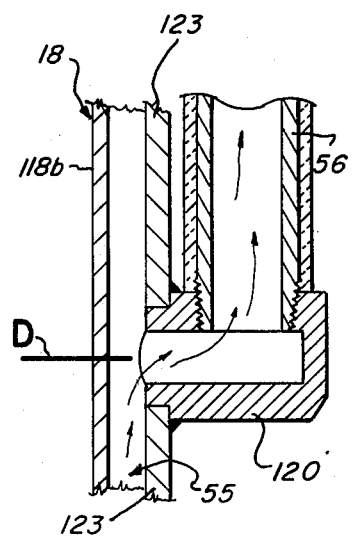

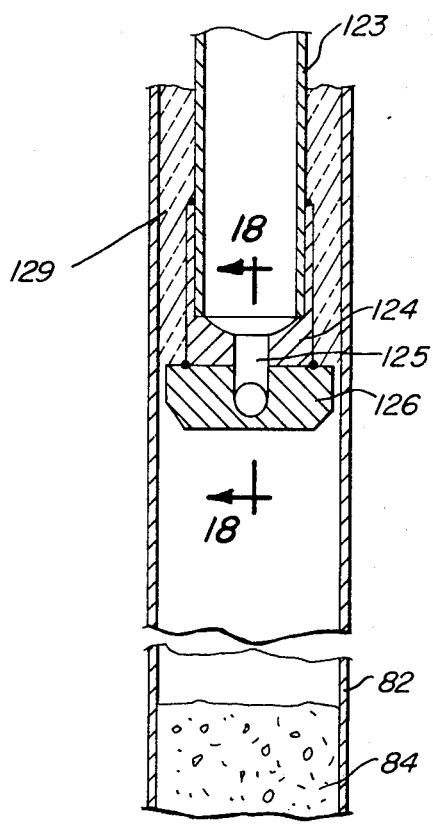
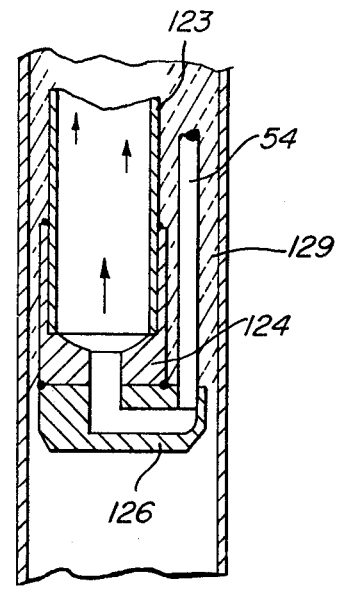
Fig-17
Fig-18
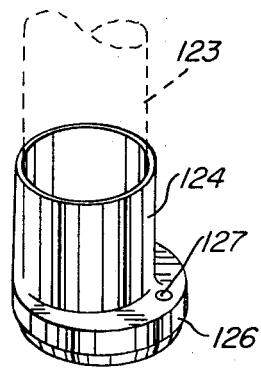
Fig-19
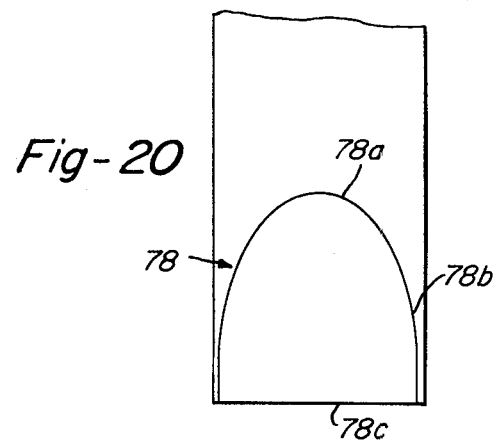
Fig-20
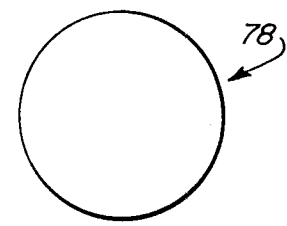
Fig-21

CHEMICAL OXYGEN DEMAND (C.O.D.)

METHOD AND APPARATUS FOR EFFECTING SUBSURFACE, CONTROLLED, ACCELERATED CHEMICAL REACTIONS

This is a continuation of application Ser. No. 887,506, filed Mar. 17, 1978, now abandoned.

FIELD OF THE INVENTION

This invention generally relates to improvements in effecting chemical reactions and more particularly to a novel and improved method and apparatus for effecting accelerated chemical reactions that is especially effective in efficiently carrying out the wet oxidation of sewage sludge and like waste streams, purifying the water content, and also recovering energy in the form of heat.

BACKGROUND OF THE INVENTION

There are a variety of chemical reactions that may be accelerated under conditions of a temperature substantially above ground surface ambient temperature and a pressure substantially above atmospheric pressure. A major part of the reactor apparatus heretofore provided for carrying out the various chemical reactions at higher temperatures and pressures typically require high pressure liquid pumps, high pressure, high temperature heat exchangers and pressure vessels with rotating seals and considerable land surface area.

One chemical reaction for which the method and apparatus of the present invention is particularly suitable is for the direct wet oxidation of materials in a waste stream and particularly the direct wet oxidation of sewage sludge. The everincreasing amounts of sewage sludge which are, of course, directly related to the population increases are an increasing concern particularly of municipalities.

The Zimpro method, Barber-Coleman process, and Navy shipboard processors are examples of current methods used to effect direct wet oxidation of sewage sludge and all involve placing the waste in a high temperature, high pressure reactor at substantially ground surface level. Air is pumped into the reactor vessel and heat is externally applied. Constant mechanical stirring is required to mix oxygen, a reactant, into the liquid and to remove carbon dioxide, a product of the reaction. Even though recuperative heat exchangers are employed, large amounts of energy are consumed in order to maintain the reaction temperature. There are also a number of obvious environmental and excessive energy problems presently associated with handling sewage sludge. Due to the nature of the sewage wastes and high pressures necessary, the equipment, operating, and maintenance costs in such methods are exceedingly high. Also, due to the high temperature and pressure, there is an attendant safety hazard.

Present practices frequently involve the transportation of the dried sewage sludge many miles to a land fill point. The land filling of dried sewage sludge presently in use has a number of obvious disadvantages. Some attempt has been made to carry out accelerated chemical reactions below the ground surface level using the increased pressures provided by a hydrostatic column of liquid or fluid. In this connection particular attention is directed to U.S. Pat. Nos. 3,449,247 to Bauer, 3,606,999 to Lawless, and 3,853,759 to Titmus.

Bauer discloses the concentration of the wastes or the addition of combustible refuse to sustain the wet oxidation process and injects air at the bottom of the hydrostatic column. Injection of air at the bottom of course requires greater pressures, larger compressors, and increases the overall costs and energy requirements. No means for controlling the temperature of the fluid in the reaction zone is suggested.

The disclosure made by Lawless is again the introduction of air at the bottom of the reactor. The bubbles introduced by Lawless are of a minute size with a large aggregate surface area. Such a bubble configuration increases the pressure differential and limits the reaction rate by restricting the flow of reactants and products across the boundary layer, thereby requiring a considerable consumption of pumping power to move the liquid through the system as compared to a system that employs enlarged bubbles. Excess heat is removed from the apparatus by dilution of the incoming feed or by withdrawal of vapor. Dilution of the incoming feed decreases the total treatment capacity and increases the unit treatment costs. Lawless also discloses the necessity of additional support for the center flow passage and provides multiple floats to accomplish this objective.

The Titmus disclosure limits any oxidation reactions to the amount of oxygen present in the material. No additional air or oxygen is added to the waste stream. Such a treatment method for sewage sludge is generally undesirable since pyrolysis of the waste results in the production of free carbon and other undesirable products. This disclosure contemplates the necessary, continuous supply of heat energy to effect the reactions. Furthermore, the rate of heat energy input controls the flow and provides a thermal head which causes the effluent to flow from the reactor. Placement of the steam line in the effluent causes an energy loss to the liquid and increases energy and operating costs.

Accordingly, it is an object of the present invention to provide a novel method and apparatus for accelerating chemical reactions at elevated temperatures and pressures.

Another object of the present invention is to provide a method and apparatus for effecting chemical reactions characterized by minimum initial capital costs, a relatively high overall thermodynamic efficiency, safety, durability, and an overall simplicity of construction and operation with a minimum land area requirement.

A further object of the present invention is to provide a novel below ground surface method and apparatus for enhancing chemical reactions at temperatures and pressures considerably above atmospheric ambient temperatures and atmospheric pressures without the necessity of the customary high pressure liquid pumps, high pressure, high temperature heat exchangers and pressure vessels with rotating seals required when the reaction takes place at the ground surface level.

Yet another object of the present invention is to provide a novel and improved method and apparatus for accelerating chemical reactions characterized by a reaction that takes place below the ground surface level, with all of the control in the area of the ground surface level, and with only minimum power requirements for pumping liquids and/or gases therethrough.

Still a further object of the present invention is to provide a novel and improved method and apparatus for accelerating chemical reactions that is particularly effective in converting a stream of waste materials such as sewage sludge to purified water and useful heat energy from the reacted waste stream.

Yet a further object of the present invention is to provide a novel and improved method and apparatus for accelerating chemical reactions characterized by the use of a hydraulic U-tube that extends a substantial depth below the earth's surface with a continuous fluid flow throughput to achieve the necessary high pressures due to the hydrostatic head of a column of liquid formed in the U-tube and the use of enlarged bubbles to introduce a gas to enhance chemical reaction with close control of all the flow rate, pressure, temperature and volume parameters necessary to carry out the process with maximum efficiency.

A further object of the present invention is to provide a novel method and apparatus that has reaction rates that are higher than those in comparable reactors using mechanical stirrers.

SUMMARY OF THE INVENTION

A method and apparatus for effecting accelerated chemical reactions utilizes a reactor having a downgoing throughpipe that extends down below the ground surface a substantial distance and back up providing a hydraulic U-tube for a reaction that takes place a substantial distance below the ground surface level. An influent fluid is pumped down the downgoing pipe portion from the ground surface level at a controlled, selected temperature, pressure, and flow rate to a selected depth below the ground surface to form a hydrostatic column sufficient to provide a selected pressure and temperature that causes the reactants to react at an accelerated reaction rate and further down the downgoing pipe portion through a reaction zone for a selected retention time whereby heat is released, reaction products are produced, and the fluid is heated in the reaction zone. The heated fluid and reaction products are flowed back up the upgoing pipe portion in heat exchange relation to the downgoing fluid to effect a substantial cooling before exiting the outlet of the upgoing pipe portion. The temperature of the influent fluid in the reaction zone is controlled by adding or removing heat to maximize the reaction rate and to prevent boiling of the fluid in the reaction zone. Once the operation is under way, heat from the exothermic reaction is removed as useful heat energy.

If a gas is used in the reaction, the results are enhanced by introducing a stream of gas under low pressure in the form of a series of enlarged bubbles, known as "Taylor bubbles", formed at the top of the reactor. Preferably the gas is introduced in a plurality of streams at more than one elevation to reduce pumping requirements. These enlarged bubbles cause the least amount of pressure differential in the flow passage and thus minimize pumping pressure to maintain a certain flow rate. These enlarged bubbles also provide intense mixing and contacting to increase the flow of reactants and products to and from the fluid since the fluid flows over the bubble and there is no boundary layer formed as is found in bubbles of smaller size. The quantity of gas injected is controlled to provide the proper ratios relative to the influent fluid since insufficient gas produces undesirable products and excess gas is wasted and reduces the reactor throughput rate. Fluid flow velocities are maintained at a greater velocity than the bubble rise velocity in order to carry each bubble down to the reaction zone. Pressure and flow rate at the output of the reactor are controlled to maintain the proper flow rates and pressure in the system.

Other objects, advantages and capabilities of the present invention will become more apparent as the description proceeds, taken in conjunction with the accompanying drawings in which like parts have similar reference numerals and in which:

DESCRIPTION OF THE DRAWINGS

FIG. 1 is a schematic diagram of apparatus embodying features of the present invention which utilizes a gas as one reactant;

FIG. 2 is an enlarged schematic diagram of the apparatus of FIG. 1 showing in more detail the manner of introducing a gas under pressure into the fluid stream to produce enlarged bubbles which flow down the outer flow passage and up the inner flow passage;

FIG. 3 is an enlarged schematic diagram showing the passages and bubbles with the flow in the opposite direction from that of FIG. 2;

FIG. 4 is a schematic diagram of the reactor with designations at various depth locations for reference to the structure shown in more detail in FIGS. 5-19;

FIG. 5 is a vertical cross-sectional view of an upper portion of the reactor;

FIG. 6 is a cross-sectional view taken along lines 6—6 of FIG. 5;

FIG. 7 is a vertical cross-sectional view of an intermediate portion of the reactor;

FIG. 8 is a vertical cross-sectional view of a lower portion of the reactor;

FIG. 9 is a vertical sectional view taken along lines 9—9 of FIG. 7;

FIG. 10 is a sectional view taken along lines 10—10 of FIG. 9;

FIG. 11 is a sectional view taken along lines 11—11 of FIG. 7;

FIG. 12 is a sectional view taken along lines 12—12 of FIG. 7;

FIG. 13 is a sectional view taken along lines 13—13 of FIG. 8;

FIG. 14 is a sectional view taken along lines 14—14 of FIG. 8;

FIG. 15 is a sectional view taken along lines 15—15 of FIG. 8;

FIG. 16 is an enlarged vertical cross-sectional view of FIG. 13 showing in more detail the flow of fluid between the jacket and flow line;

FIG. 17 is a sectional view taken along lines 17—17 of FIG. 8;

FIG. 18 is a sectional view taken along lines 18—18 of FIG. 17;

FIG. 19 is a perspective view of the bottom of the jacket of the reactor;

FIG. 20 is an enlarged side elevational view of a Taylor bubble;

FIG. 21 is a bottom view of the bubble shown in FIG. 20;

DESCRIPTION OF THE PREFERRED EMBODIMENTS

Figure 22:
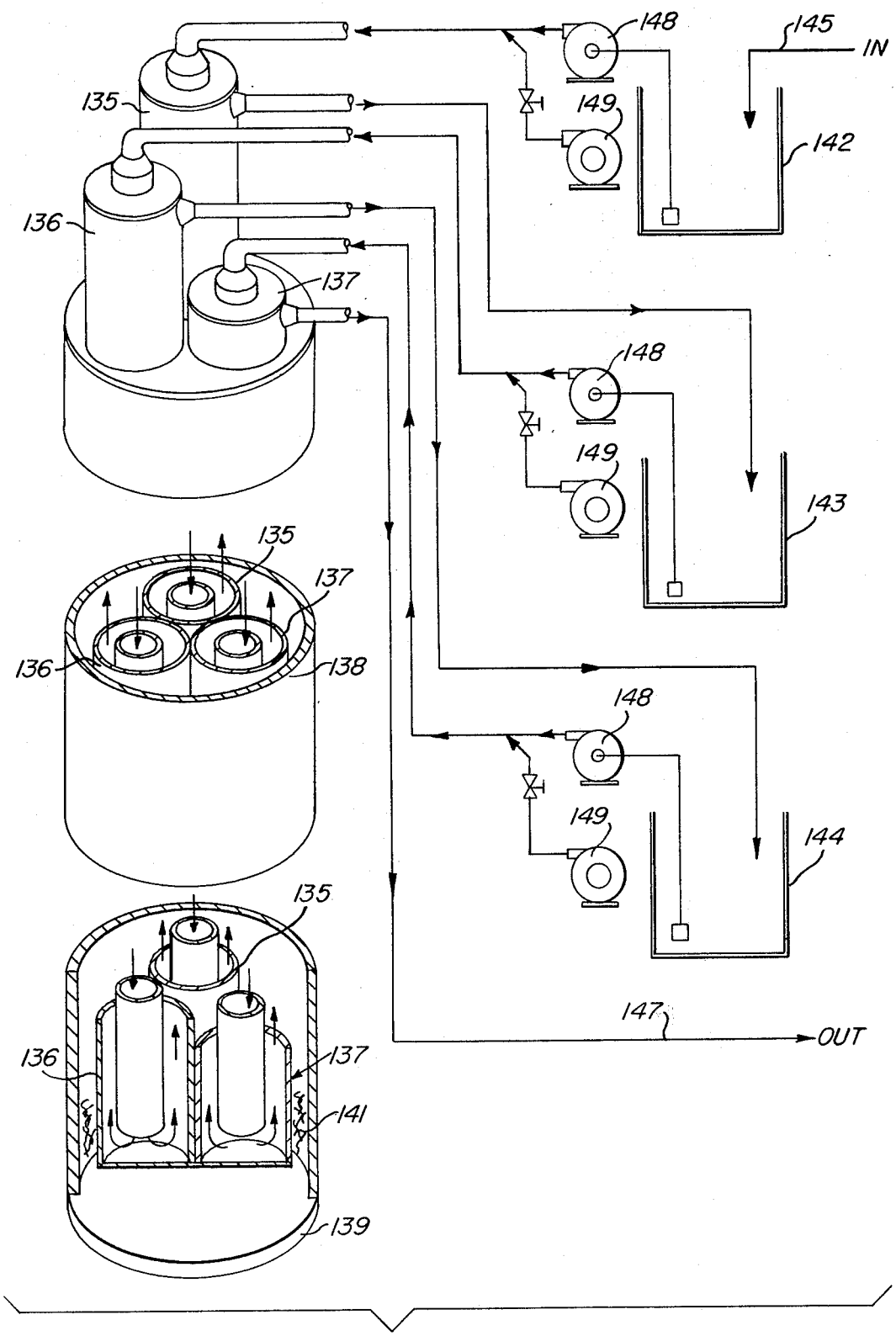
FIG. 22 is a diagrammatic view showing three reactors connected in series and placed in one outer casing.

Referring now to FIG. 1, the schematic diagram shows a reactor 15 constructed and arranged in accordance with the present invention that extends into a vertical hole 16 in the earth to a substantial extent below the ground surface level designated 17. The reactor 15 shown in general has an outer pipe portion 18 and an inner pipe portion 19 in spaced concentric relation with the outer pipe portion 18 defining an outer flow passage 21 between the outer and inner pipe portions and an inner flow passage 22 through the inner pipe portion 19. The outer pipe portion 18 has a closure cap 24 covering the lower end thereof and the inner pipe portion 19 terminates a selected distance above the closure cap 24 to form a subsurface, hydraulic U-tube structure within hole 16.

The reactor 15 shown further has an upper portion projecting above the ground surface level 17 provided with a port 26 in flow communication with the outer flow passage 21 through which an influent fluid is shown as flowing, as indicated by arrows, and a port 27 in flow communication with the inner flow passage 22 through which the effluent fluid is shown as flowing, as indicated by arrows. While the direction of the arrows shows the flow of the influent fluid down the outer flow passage 21 and up the inner flow passage 22, this provides a greater input flow capacity for influent fluids, which usually have a greater viscosity than effluent fluids, but it is understood that the direction of fluid flow can be reversed as illustrated in FIG. 3.

A low-pressure pump 29 at the ground surface level is provided to pump the influent fluid supplied from a suitable supply indicated at 38 via a supply flow line 31 with a pressure control valve 32 at a selected pressure through port 26 via a flow line 33 coupled between the pump and port 26 and down the outer flow passage 21, as indicated by arrows. A bypass control valve 34 in a bypass line 35 bypasses the pump 29 for flow directly from flow line 31 to flow line 33 since, after the fluid is flowing through the U-tube structure, in many instances no pumping pressure will be required to sustain a continuous flow therethrough. A back pressure control valve 36 in an outlet flow line 37 from outlet 27 controls the flow rate and pressure of the effluent fluid flowing up through flow passage 22 by virtue of the size of the orifice therethrough. A supply of influent fluid is indicated at 38, and the flow therefrom into flow line 31 is controlled by control valve 32. The pump 29 controls the pressure and flow rate through flow line 33 during start-up and valves 34 and 36 control the pressure and flow rate during operation.

The apparatus shown in FIG. 1 is suitable for carrying out the direct wet oxidation of a waste stream, and particularly aerobic sewage treatment plant sludge waste, although it is understood that the present invention is capable of carrying out a variety of high-temperature, high-pressure chemical reactions.

In the illustrated flow diagram where a sewage sludge stream is being processed, the effluent fluid passing through flow line 37 is passed into an ash settling tank 41 with clean water being recycled back as a clean or purified diluent to the feed flow line 31 via a flow line 42 with a control valve 43 to control the concentration of the influent fluid so that the settings of valves 39 and 43 achieve a blend of influent fluid having a selected C.O.D. The mass of oxygen required to complete the oxidation reaction is termed the "chemical oxygen demand" (C.O.D.) of the sewage sludge. The settling tank 41 has a purified water discharge flow line 44 and an ash flow line 45.

Temperature control apparatus is provided for controlling the temperature of the influent fluid in the reaction zone designated R. This temperature control apparatus includes a coolant pump 51 at the ground surface level that pumps a coolant fluid stored in a ground level coolant tank 52 through a heater 53 at the ground surface level down to the bottom of a heat exchange jacket 55, through a valve-controlled flow line 54, and back up the hole through a valve-controlled flow line 56.

The heater 53 may take a variety of forms but, as illustrated schematically, is an electric heater supplied electric power from a power source 53a with a control rheostat 53b for regulating the voltage applied to a heating element 53c to change the heater temperature setting and thereby the temperature of the coolant fluid flowing in flow line 54. The jacket 55 is of a hollow, annular, tubular construction that is substantially coextensive with the reaction zone R and further is in heat exchange relation with the outer flow passage 21, as is described more fully hereinafter.

The other flow line 56 is coupled to and extends from the top of the jacket at the top of the reactor zone up to the ground surface level and is coupled to tank 52 by a return valve-controlled flow line 56a to add heat to a fluid in lines 54 and 56. A heat removal circuit includes a valve-controlled flow line 56b coupled to line 56 down to the top of the jacket 55 and a valve-controlled flow line 54b above the ground surface coupled to a heat exchanger 58 which in turn is coupled to tank 52 to provide a closed-loop, fluid flow temperature control circuit. The flow control valve in flow line 54b controls the rate of flow in this fluid flow circuit.

By means of regulating the temperature of the coolant fluid in the jacket 55 and flow lines 54 and 56, the temperature of the influent fluid in the reaction zone R is controlled. This is accomplished by adding or removing heat to and from the coolant fluid and is controlled to accomplish substantially a maximum reaction rate with the vapor pressure of the influent fluid at the local temperature being maintained always lower than the local pressure to prevent boiling of the influent fluid. The temperature of the influent fluid is increased by adding heat provided by the heater 53 that heats the coolant fluid passing through flow line 54 and down into jacket 55 by the pressure supplied by pump 51, with the flow rate of the coolant fluid controlled by the setting of the control valve in line 54.

The upper limit of the temperature of the influent fluid in the reaction zone is controlled by regulating the heat removed from the heat exchanger 58 and the flow rate which is controlled by the setting of the valve in line 54b. The amount of heat removed is directly related to the setting of the valve in line 54b. A turbine 60 is shown coupled to the heat exchanger 58 via a flow line with a control valve 66 as an illustration of the utilization of the energy, and specifically the heat produced by the reaction, to convert heat energy to mechanical energy. Alternatively, load 67 is shown coupled to the heat exchanger via a flow line with a control valve which could be a room heated by the heat produced by the reactor.

A pressure sensor for measuring the pressure at the upper limit or beginning of the reaction zone R includes a small-diameter tube 61, such as an ⅛ inch stainless steel tube, that extends down through the inner pipe portion 19 to the upper limit of the reaction zone R. At the ground surface level a pressurized bottle 62 provides a selected air pressure to flow air down through the tube 61 via a delivery valve 63. Between the bottle 62 and tube 61 there is coupled a delivery air pressure gauge 64 and a pressure regulator 65. To make a pressure reading, water is flushed out of the tube 61 and the delivery valve 63 is closed. The reading on the pressure gauge 66 is the pressure inside the reactor at the upper limit or top of the reaction zone which is a critical part of the temperature and pressure for the reactor.

In chemical reactions where a gas is used as a reactant, and specifically in carrying out the wet oxidation of sewage sludge where the oxygen content of air is required, it has been found that the operation and results are significantly enhanced by the use of enlarged gas bubbles 78. With specific reference to FIGS. 20 and 21, these bubbles are characterized by a shape that has a generally spherical cap portion 78a, a generally cylindrical main body portion 78b, and a truncated bottom portion 78c. The transverse cross section is circular. In the enlarged view it is shown that the body portion diverges from the top portion to the base portion along a curve. This bubble is frequently referred to as the "Taylor bubble" after G. J. Taylor who is credited for accomplishing their original investigation. The Taylor bubbles are compressed as they flow down through the outer flow passage and, upon reaching the reaction zone, the oxygen carried therein is a reactant in a reaction which causes an intense mixing, contacting and a rapid oxidation of the sewage sludge with smaller bubbles returning via the inner passage.

The principal advantages of the use of these bubbles as compared to a swarm of very fine bubbles are that the pressure drop per length of pipe for the Taylor bubble is considerably less, thereby reducing the pumping requirements to pump the fluid and bubbles down into the earth, and further there is accomplished a greater total mass transfer between the gas and the liquid phase in the reaction zone R. This results in an increased gas-liquid mixing with greater dissolving of the gas in the liquid and a greater removal of the reaction products from the liquid.

The apparatus shown that is utilized for forming these enlarged bubbles is an air compressor 71 at the ground surface which, through one or more flow lines, delivers one or more streams of air at a selected pressure into the upper portion of the outer flow passage to combine with the influent fluid from the input flow line 33. A series or train of enlarged or Taylor bubbles 78 are formed that are carried down with the influent fluid.

For this purpose there is shown a control valve 76 in a flow line 77 that extends into flow line 33 at ground level and a control valve 74 in flow line 75 extending to one depth below the earth's surface, as well as a control valve 72 in line 73 extending yet further into the earth's surface. A terminal pipe section or portion of each of the flow lines 73, 75 and 77 extends in a longitudinal relation to and within the downgoing flow passage with an outlet opening toward the downstream end of the downgoing flow passage so that a stream of air is introduced under a selected pressure and flow rate into the influent fluid stream. By the proper selection of pressure, temperature, and flow rate in relation to the flow rate and pressure of the influent fluid, bubbles coalesce into a train of Taylor bubbles 78 arranged at spaced intervals along the outer flow passage 21.

These enlarged or Taylor bubbles will rise at a uniform rate with respect to water. Their relative velocity with respect to water is given by:

$$v = 0.46\sqrt{g_c r}$$

where:
$g_c = 32.2$ ft/sec$^2$
r = pipe inside radius (ft.)

In the apparatus shown the flow velocity of the influent fluid waste stream must be maintained at a greater value than the bubble rise velocity, in order to carry each of the bubbles down to the reaction zone R. The influent fluid flows over the bubble and maximizes the mass transfer between the liquid and gas phases in the reaction zone. Since the oxidation reaction is overall first order, the rate of reaction is directly proportional to the amount of products and reactants in the liquid. The Taylor bubble provides a smaller hydrodynamic pressure loss inside the flow passage as compared to a swarm of smaller bubbles, thereby reducing the amount of energy required to flow the material at a certain rate through the U-tube structure. Smaller size bubbles create a large hydrodynamic pressure loss throughout the hydraulic column. Also a smaller bubble has a boundary layer of water associated with it which impedes the mass transfer between the two phases. Thus the Taylor bubble maximizes reaction rates while minimizing horsepower required for pumping the fluid through the pipe system.

To minimize the horsepower required by compressor 71, air is introduced at the top of the outer flow passage 21 at more than one elevation, as shown in FIGS. 1 and 2. Air is introduced at the highest elevation at the lowest pressure in an amount equal to one volume of air per volume of liquid. As the fluid descends, the pressure increases and the air is compressed. Additional air is injected at a lower elevation and at successively higher pressures, again at an amount equal to one volume of air per volume of liquid. This sequential injection of air at successively greater depths minimizes the compressor requirements and provides the oxygen necessary to oxidize the reactants in the liquid.

The pressure at any point in the reactor depends upon the mass of the fluid above. If only water were used, the pressure gradient would be approximately 0.43 psi per foot of depth. However, the downgoing flow passage 21 contains a substantial volume of gas which is compressed in volume and heated as it travels downwardly.

In summary, by introducing the air at different elevations below the earth's surface, less pumping pressure is required and once the process is in operation the downflowing influent fluid material will draw the liquid in without the necessity of a liquid pump. This Taylor bubble configuration minimizes compressor requirements, creates the least amount of pressure differential, and increases the flow of reactants and products to and from the fluid, since the fluid flows over the bubble, and there is no boundary layer formed as found in bubbles of smaller size.

The reactor shown in more detail in FIGS. 5-10 is located inside a well hole, lined with a well casing comprised of an enlarged upper section 81 and a smaller diameter lower section 82 that has grout at 83 outside section 82 throughout the vertical extent of sections 81 and 82, and has a grout plug 84 closing and sealing the bottom of casing section 82. The upper end of well casing section 81 is secured as by welding to a circular base plate 86 recessed to be flush with the ground surface 17.

In general, the outer pipe portion 18 and inner pipe portion 19 are supported in a suspended depending manner from the base plate 86 in such a way as to allow for expansion and contraction thereof relative to the well casing due to temperature changes.

The upper end of the top pipe section of the outer pipe portion 18 is secured as by welding to a circular base plate 87 that rests on base plate 86 to support the outer pipe portion 18 in a suspended depending manner in the casing 82. Two flow pipes 54 and 56 for conveying fluid to and from the coolant jacket 55 extend down through a bushing in the base plate between the well casing and the exterior of the outer pipe portion.

There is further provided above the ground surface level an extension of the outer pipe portion 18 including a straight coupling 89 threaded on external threads of the top subsurface pipe section of outer pipe portion 18 affixed to plate 87 that rests on plate 86, a pipe nipple 91, a tee coupling 92, and a pipe 93 having a flange plate 94 secured as by welding to the upper end with the lower end threaded into the tee coupling 92. A flange plate 95 rests on flange plate 94 and has the upper end of the inner pipe portion 19 secured thereto as by welding so that the inner pipe portion 19 is supported in a suspended depending manner from the outer pipe portion 18, which in turn is supported on plates 86 and 87.

Yet a third top flange plate 96 rests on flange plate 95 and has an upper pipe nipple 97 threaded thereto with a top coupling 98 secured thereto to provide the coupling to the flow line 37 through which the effluent fluid is passed. There is further shown a gasket 101 between plates 94 and 95 and a gasket 102 between plates 95 and 96, together with a bolt fastener 103 to hold the flange plates together in a sealed watertight manner. The pressure sensing tube 61 is shown as extending down through the center of flange plate 96 and the inner pipe portion 19, which is shown to extend up above the ground surface level to connect to flange plate 95.

The two flow lines 54 and 56 for conducting the coolant fluid extend from the ground surface down through support plate 87 and are supported on the outer pipe section, as best seen in FIGS. 9 and 10. Each coolant fluid flow line has a series of alternating pipe sections shown as a relatively long, rigid pipe section 109 on the order of 100 feet and a flexible pipe section or hose 111 on the order of two feet that are joined end-to-end to one another by a coupling 112. The lower end of the rigid pipe portion 109 rests on a support surface provided by a lower bracket 110 clamped to the outer pipe portion 18.

A supporting guide bracket 113 guides the upper end portion of the outer pipe portion 18 in an axial sliding movement and has an annulus 114 which in turn carries a resilient sleeve 115. The rigid pipe section 109 is axially movable in the resilient sleeve to allow for axial movement of these flow lines for contraction and expansion due to temperature changes. Each flexible pipe section 111 is shown in a bowed configuration to allow for expansion and contraction. The coupling 112 on the lower end is slidable with pipe section 109 and the coupling 112 on the upper end is held by bracket 110. The flexible pipe section 111 may be made of a bellows-like conduit covered with a heat-resistant braided cover.

As best seen in FIGS. 7 and 8, the outer pipe portion 18 extending from ground surface into the hole is made up of a plurality of end-to-end pipe sections 118 connected at adjacent ends by API (American Petroleum Institute) couplings 116. These couplings have a substantial taper at each end and are standard well-type pipe couplings. The pipe sections making up the outer pipe portion 18 above the reaction zone as shown are made of black iron with a stainless steel liner 108 shown in FIGS. 11 and 12 and extend from the reaction zone up to a depth below the surface level of about 500 feet. This construction prevents corrosion.

In a like manner, the inner pipe portion 19 is made up of a plurality of end-to-end pipe sections 119 connected at adjacent ends by end welds. As shown in FIG. 15, the bottom pipe section of the outer pipe portion 18 has a shaped 180-degree turnaround provided by an end cap 24 to prevent plugging by scouring which directs the flow up through the inner pipe portion 19. Since there is no pressure differential across the wall of the inner flow passage, a thin-walled tube is used. Use of a thin-walled tube decreases cost and allows for better heat exchange between the hot reacted effluent fluid and the cool untreated influent fluid.

For reference purposes, the inside diameter of the outer pipe portion 18 above the reaction zone is designated D1, the inside diameter of the inner pipe portion 19 above the reaction zone is designated D2, the inside diameter of the outer pipe portion in the reaction zone is designated D3, and the inside diameter of the inner pipe portion 19 in the reaction zone is designated D4.

The jacket 55 is provided on the outer pipe portion beginning at a selected depth below the ground surface level, which is at the top or beginning of the reaction zone R. At this depth both the outer and inner pipe portions are reduced in size to provide a substantially constant mass flow rate.

As the fluid flows down the outer flow passage, the gas is compressed and as a result the volumetric ratio of gas to liquid decreases with a resulting decrease in the velocity of the liquid. To maintain more nearly constant flow velocity, the outer and inner pipe portions are reduced in size in the area of the reaction zone. This reduction in size increases the amount of production per capital investment and also maintains at least the flow velocity required to sweep the gas bubbles downward.

As shown in FIG. 11, an inner pipe section 119a a distance above the reaction zone has a reducing sleeve or coupling 121 along the inside which receives a smaller diameter inner pipe section 119b. In a like manner, as shown in FIG. 12, an outer pipe section 118a below coupling 121 and above the reaction zone carries a reducing coupling or sleeve 122 which in turn has an inside cut into which a smaller diameter outer pipe section 118b is fitted. The outer pipe section 118a preferably is black iron lined with a stainless steel tubing 108 above fitting 122 extending up to about 500 feet below the ground surface. The reduction couplings are preferably made of stainless steel and machined to have a smooth, tapered entrance surface to prevent plugging. A larger outer pipe section 123 fits over an annular outer cut on sleeve 122 with a space between pipe sections 123 and 118b forming the coolant jacket 55 which extends down to the bottom of the reactor.

The heat from the reaction is collected in the jacket 55 and is passed therefrom, or heat may be input, in the form of a heated coolant fluid and/or steam to assist in starting up the reactor. At the upper end of the jacket 55 there is a fitting 120 mounted on pipe section 123 coupling flow from line 56 to the interior of the top portion of the jacket. At the lower end of the outer jacket 55 there is an end cap 124 that cups over the lower end of the outer pipe section 123 forming the jacket and is secured thereto as by threads or welding. End cap 124 has a vertical aperture 125 in the bottom thereof.

A fitting 126 shown in FIGS. 17, 18 and 19 is secured as by welding to the bottom of the end cap 124 and extends laterally out so as to be offset to one side thereof. The fitting 126 has a passage that opens into the bottom of the jacket and has a hole 127 at one end and couples to flow line 54. The jacket with end cap and fitting terminates a distance above the plug 84 to allow for up-and-down movement thereof relative to plug 84 due to expansion and contraction.

To monitor temperature, temperature sensors in the form of thermocouples 131, shown in FIG. 4, are placed on the outer pipe portion at approximately 250-foot intervals and are connected to a temperature indicator T at the surface level.

A large heat loss can result from the presence of water inside the well casing 81 and 82. Such water will vaporize and rise to a cooler level, where it condenses and then flows down the external wall surface of the reactor until it is vaporized again. This refluxing action reduces the overall energy efficiency and feasibility of the process. To prevent this problem the inside of the casing can be dried by pumping or purging or can be insulated with a layer of insulation indicated at 129, shown in FIGS. 8, 17 and 18. A plastic-coated fiberglass bat, rock wool, or ceramic felt has been found to be effective as an insulation for this purpose, which serves as a baffle to prevent conductive and convective heat losses.

Typical C.O.D. values for various wastes are shown in the following table:

| Sewage Type | C.O.D. |
| --- | --- |
| Municipal sewage | 150 |
| Processed refinery waste water | 2,000 |
| Raw refinery waste water | 40,000 |
| Industrial laundry water | 13,000 |
| Meat plant waste | 3,000 |
| Cheese factory whey water | 60,000 |
| Digested municipal sludge | 14,000 |

With regard to selecting the parameters for a given waste processing requirement, the graphs on FIGS. 23-28 are provided. The requirements given are the input C.O.D. of the waste typically expressed in milligrams per liter (mg/l), input pounds of C.O.D. per day, and the required percent C.O.D. reduction.

To achieve equal flow velocities in the two concentric flow passages, the diameter of the outer pipe portion should be equal to $\sqrt{2}$ times the diameter of the inner pipe portion.

Figure 23:
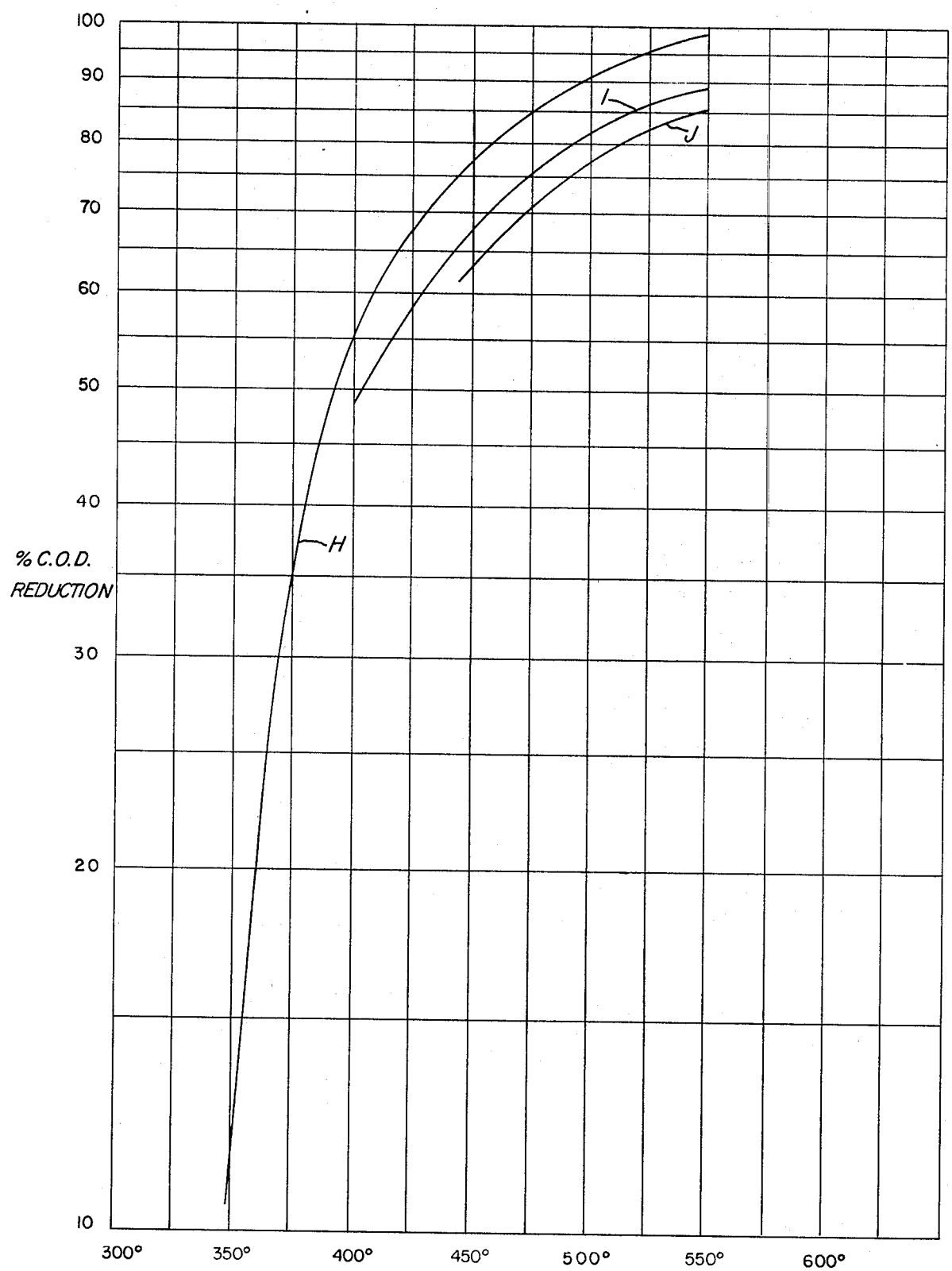
FIG. 23 is a graph that relates actual C.O.D. reduction achieved at various temperatures for a selection of typical wastes based on tests.

FIG. 3 has curves H, I and J which show the oxidation reaction in terms of the percent C.O.D. reduction achieved at various temperatures for various wastes. The three curves shown are curve H for municipal sludge; curve I for whey water and wood pulp paste, and curve J for raw hog manure. FIG. 23 shows there is a non-linear relationship with a greater percent C.O.D. reduction at higher temperatures. Curve H, for example, shows that, for municipal sludge to accomplish approximately a 70% C.O.D. reduction, the reaction temperature required would be about 425° to 430° F. This curve, based on tests of the example reactor, indicates a considerably better percent C.O.D. reduction at the various temperatures than known ground surface operated reactors that require mechanical stirring, as above discussed.

Figure 24:
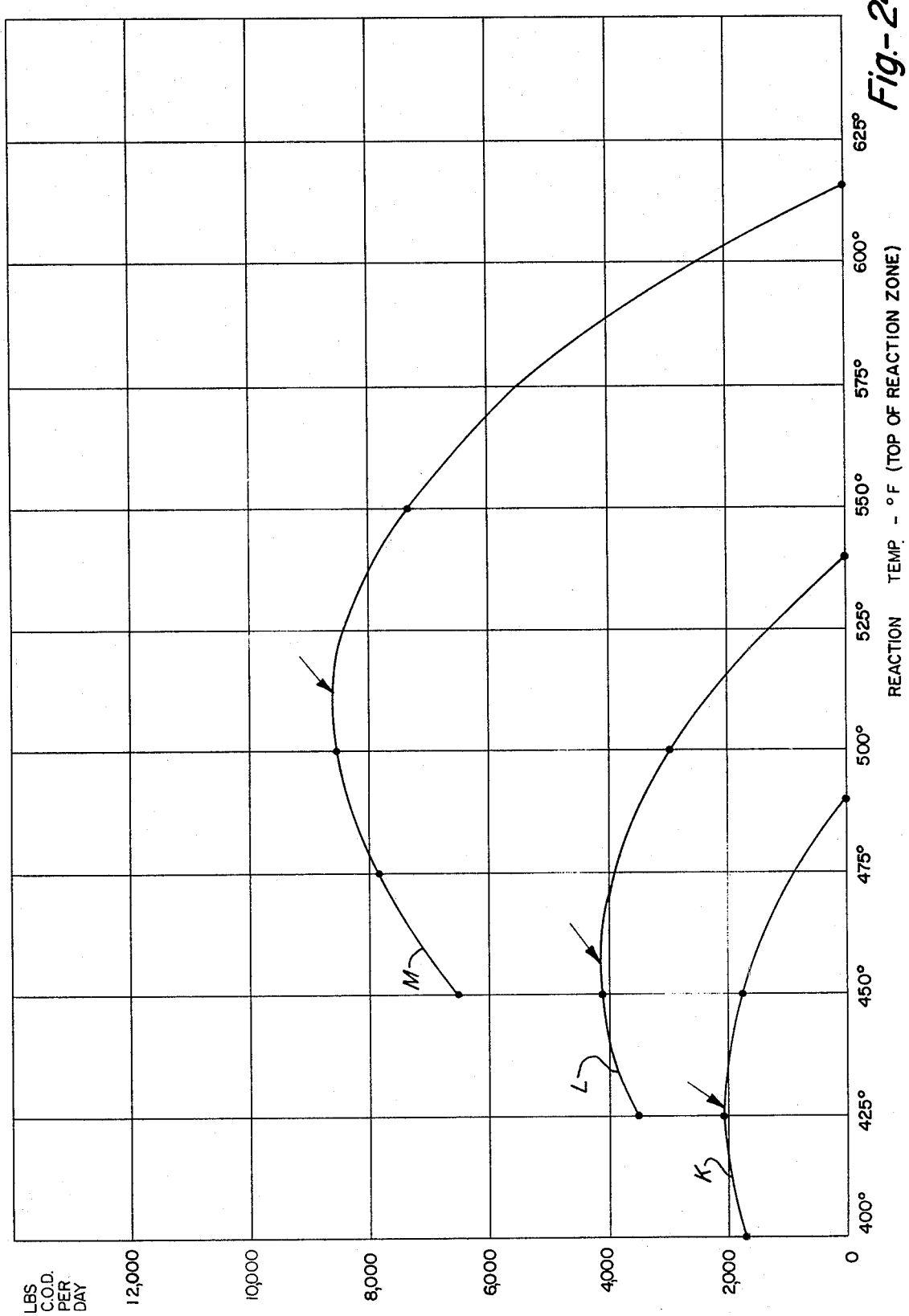
FIG. 24 is a graph showing the variation in processing rate for an 8-inch reactor as a function of temperature for various depth reactors.

FIG. 24 has three curves relating the maximum C.O.D. rate in terms of pounds C.O.D. per day as a function of reaction temperatures. The values are calculated based on a reactor diameter D3 of about 8 inches. Curve K is for a reactor having a depth of 1500 feet with a reaction zone of 500 feet for 2050 pounds C.O.D. per day achieving a 70% reduction. The arrow indicates a peak of about 2100 pounds C.O.D. per day at 430° F. Curve L is for a reactor having a depth of 2500 feet with a reaction zone of 750 feet for 4100 pounds of C.O.D. per day achieving a 79% C.O.D. reduction. The arrow indicates a peak of about 4200 pounds C.O.D. per day at 460° F. Curve M is for a reactor having a depth of 4500 feet with a reactor zone of 1000 feet for 8700 pounds C.O.D. per day achieving a 93% C.O.D. reduction. The arrow indicates a peak on curve F of about 8500 pounds C.O.D. per day at 510° F.

Figure 25:
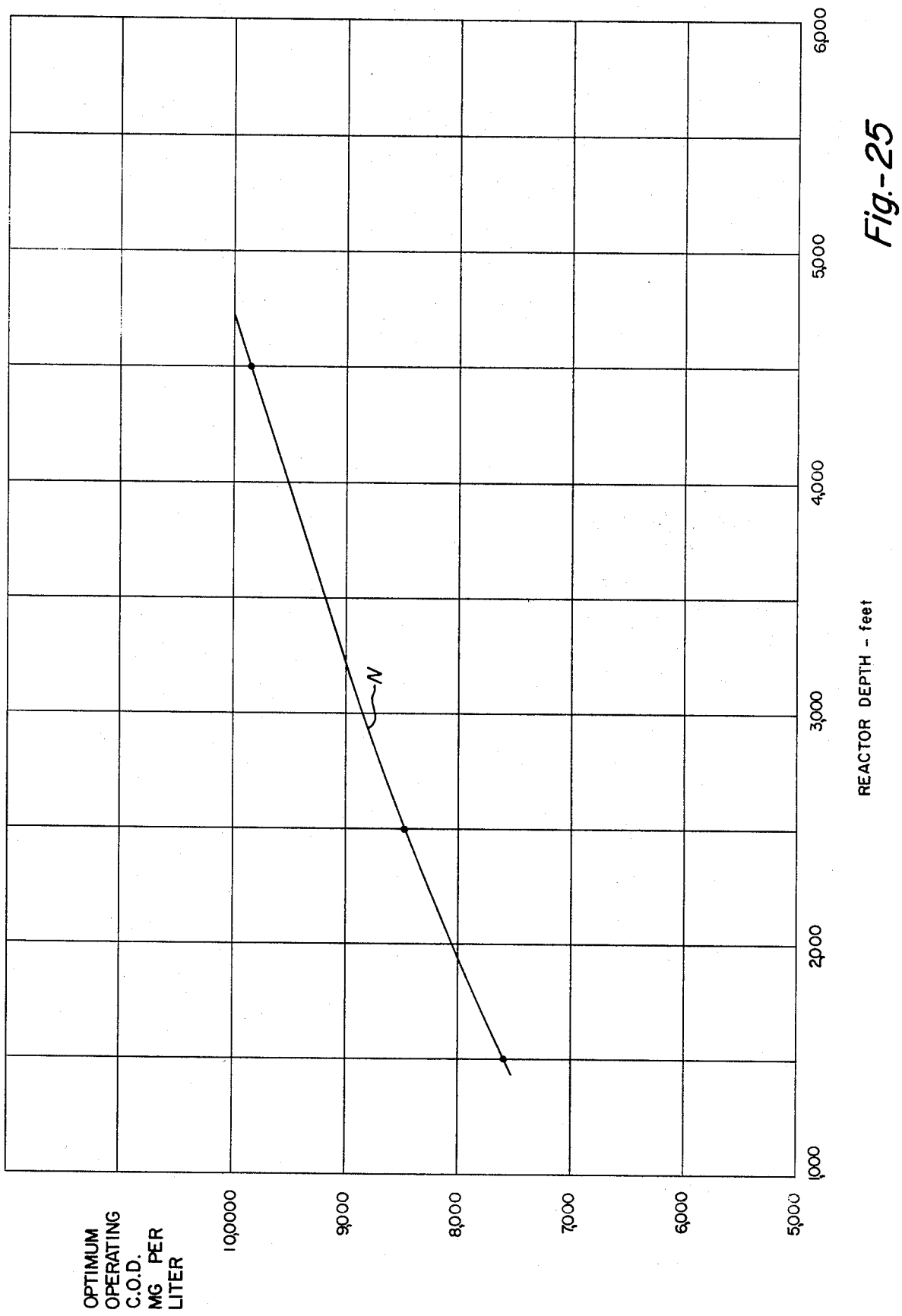
FIG. 25 is a graph that shows the optimum C.O.D. for an 8-inch reactor as a function of reactor depth.

FIG. 25 shows a curve N relating optimum operating C.O.D. to reactor depth. This curve is for a reactor having about an 8-inch diameter designated D3 at an air injection pressure of 200 psia and at 75° F. For example, at a depth of 4500 feet in this reactor there would be a maximum C.O.D. of about 9700 mg/l.

Figure 26:
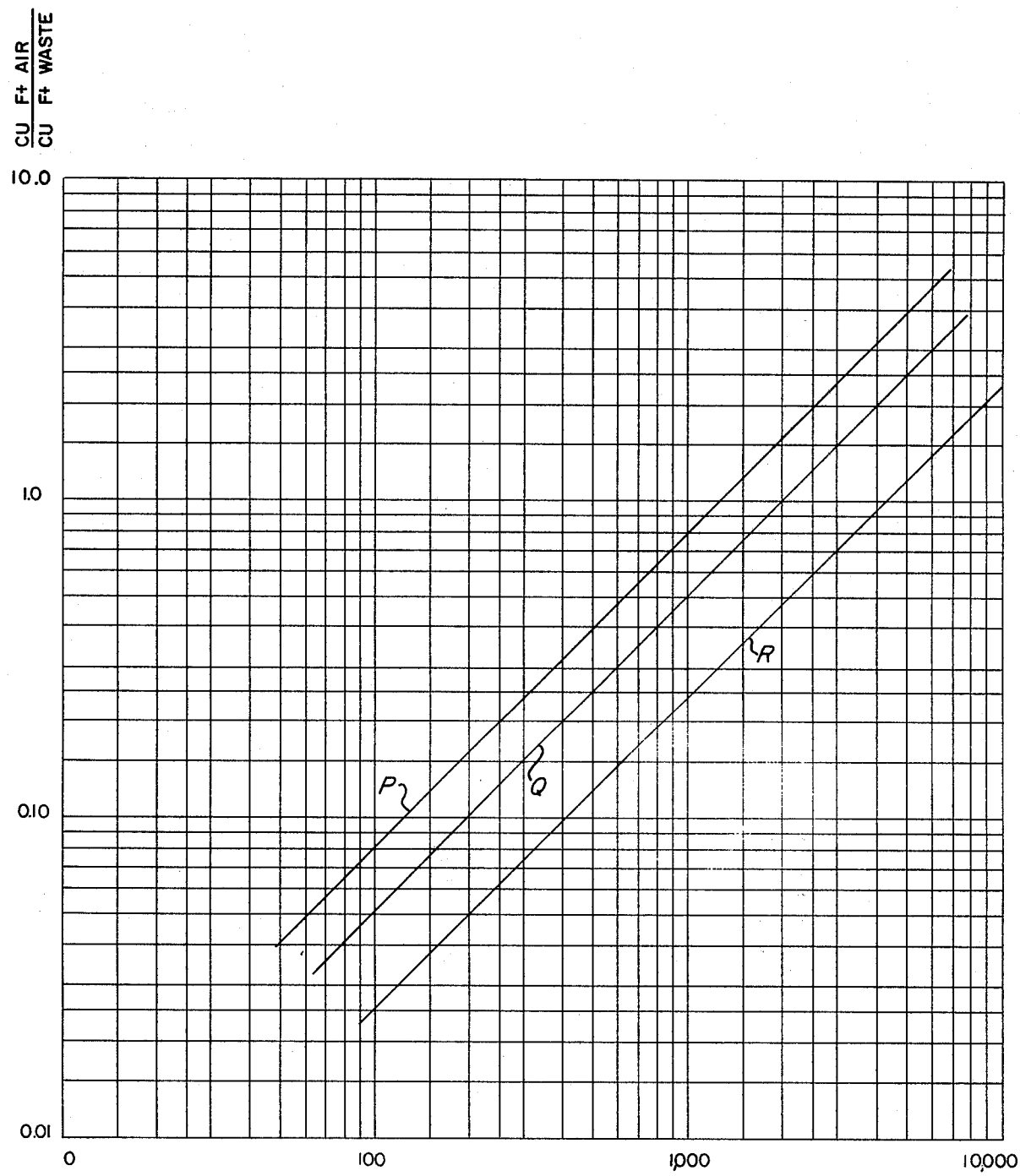
FIG. 26 is a graph showing the air-to-waste ratio required to completely oxidize a waste having a certain C.O.D. at various pressures.

Referring now to FIG. 26, three curves P, Q, and R relate the air-to-waste ratio required at 70° F. for air injection pressures of 50, 100 and 200 psia, respectively, to completely oxidize a waste such as sewage sludge for a range of required C.O.D. At a required C.O.D. and a selected pressure of air input, the air-to-waste ratio is taken from the curve to calculate the flow rate of the air or other gas to be introduced under pressure in cfm to form the bubbles.

Figure 27:
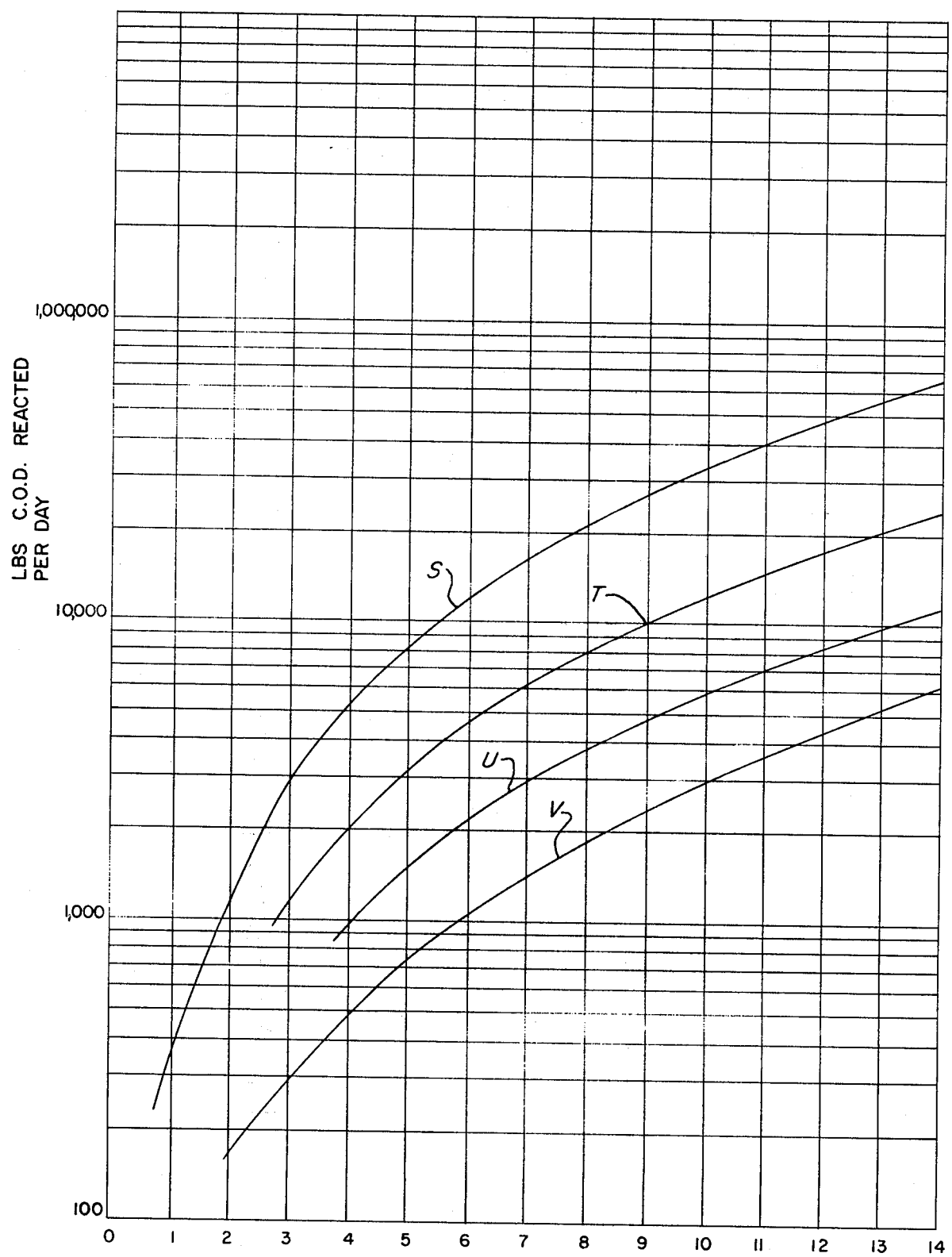
FIG. 27 is a graph that shows the relationship between reactor diameter and pounds C.O.D. per day for several reactor sizes.

FIG. 27 has four curves S, T, U and V which relate pounds C.O.D. reacted per day to the diameter of the reactor for four different reactor sizes. Curve S is for a reactor having a depth of 6000 feet and a reaction zone of 2500 feet with a C.O.D. reduction of 98%. Curve T is for a reactor having a depth of 4500 feet with a reaction zone depth of 1000 feet with a C.O.D. reduction of 90%. Curve U is for a reactor having a depth of 2500 feet and a reaction zone of 750 feet with a C.O.D. reduction of 78%. Curve V is for a reactor having a depth of 1500 feet and a reaction zone of 500 feet with a C.O.D. reduction of 68%. The curves of FIG. 27 are based on an air injection pressure of 200 psia.

Figure 28:
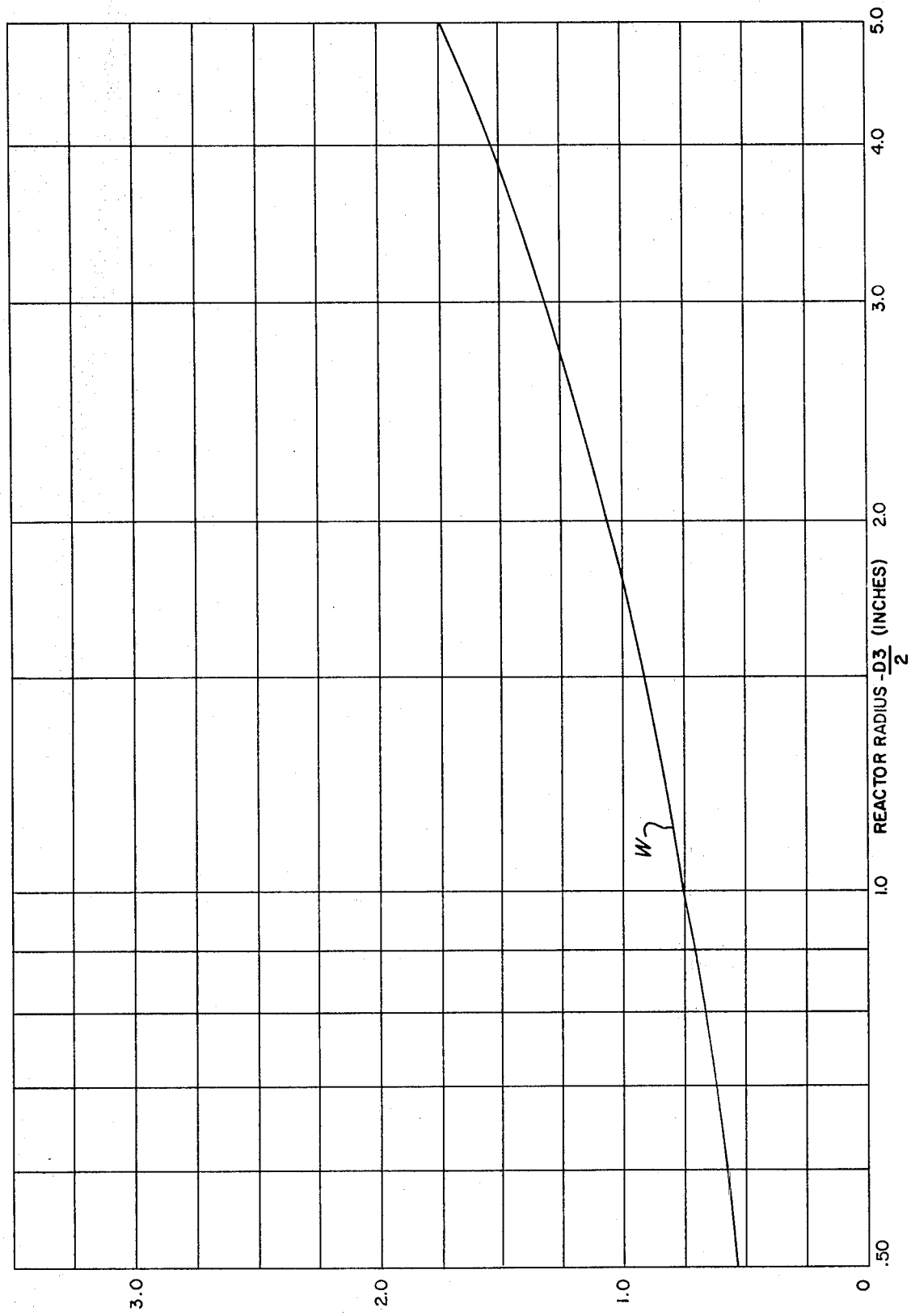
FIG. 28 is a graph that shows the maximum bubble rise velocity, with respect to the surrounding liquid, as a function of pipe radius.

The curve P on FIG. 28 relates the maximum bubble rise velocity with respect to the surrounding liquid to the radius of the reactor. Once the above parameters have been established the bubble velocity in feet per second is obtained from this curve.

OPERATION

The influent fluid which in the specific application described herein is a stream of sewage sludge is pumped from supply 38 via flow lines 31 and 33 into and down the outer flow passage 21. A stream of air under pressure is pumped into the outer flow passage to form a train of spaced Taylor bubbles 78 and the pressure provided by pump 29 is sufficient to move both the influent fluid and bubbles down the outer passage 21. As the two proceed down below the ground surface, the temperature and pressure increase and they reach a point at which oxidation proceeds at an accelerated reaction rate, indicated at line D, and proceeding to the bottom, indicated at line G. The area between lines D and G is designated R.

In the reaction zone R the pressures and temperatures rapidly mix the oxygen with the water to cause a rapid oxidation of the combustible solids and a generating of heat to heat the fluid. Some of the reaction products resulting from the oxidation are $CO_2$, $H_2O$, $N_2$+heat. The heated fluid and reaction products, termed the "effluent fluid", then flow up the inner flow passage 22 in heat exchange relation to the downflowing influent fluid. Upon exiting the reactor, the effluent fluid is flowed through the ash settling tank and then is either used as a diluent for the influent fluid to maintain the proper influent C.O.D. or is discharged via flow line 44.

The blend or concentration of the reactants in relation to one another in relation to the amount of liquid content (water) of the influent fluid is controlled by the settings of valves 72, 74, 76, 43 and 39 relative to one another. It should be noted that each of these controls is adjustable or settable at or in the area of the ground surface level.

During start-up, heat is usually added to the reaction zone to heat the influent fluid by pumping a coolant fluid from tank 52 through heater 53, down flow line 54, through jacket 55, and back up flow line 56. After the temperature rises to about 400° F. at the upper level of the reaction zone and heat is produced from the ensuing exothermal reaction, the direction of flow of the coolant fluid in lines 54 and 56 is reversed and pumped from the jacket up through flow lines 54 and 54b into the heat exchange unit 58, from which heat or work via a steam turbine generator 60 may be derived or heat may heat the room 67.

Temperature at the start of the reaction is controlled by varying the setting of control 53b and by the flow rate in line 54. Temperature during operation is controlled to maintain the vapor pressure of the influent fluid at the local temperature lower than the local pressure to prevent boiling while maximizing the reaction rate.

Referring now to FIG. 22, there is shown an arrangement of the present invention wherein three subsurface reactors 135, 136 and 137 are mounted in one outer wall casing 138 for greater treatment capacity in one vertical hole of shorter depth than would be required for one long reactor. Again the casing has grout lining the inside of the hole and has a grout plug seal 139 at the bottom. The void between the reactors and casing is shown filled with an insulation 141.

As previously described, each reactor has an outer pipe portion and an inner pipe portion with associated input and output ports above the ground surface. In the arrangement shown there is a tank 142 for reactor 135, a tank 143 for reactor 136 and a tank 144 for reactor 137. A fluid pump 148 and an air compressor 149 are associated with each reactor, as previously described. Influent fluid indicated at line 145 and gas under pressure are pumped into tank 142 and from tank 142 down reactor 135 with effluent fluid from reactor 135 to the tank 143. Influent fluid from tank 143 and gas are pumped into reactor 136, with effluent fluid out of reactor 136 pumped into tank 144. Finally, effluent fluid and gas under pressure are pumped from tank 144 into reactor 137 and effluent fluid from reactor 137 is passed to a point of use via line 147.

This arrangement of three reactors coupled in series increases the C.O.D. reduction over a single reactor having the same retention time, apparently due to the fact that the reaction product $CO_2$ can be removed via the tanks 142, 143.

By way of illustration and not by way of limitation, below is a table listing an example and typical ranges for the above described apparatus and method for treating sewage sludge and like waste streams with combustible materials.

TABLE

| | | Example | Range |
|---|---|---|---|
| 1. | Reactor | | |
| | Above Reaction Zone Diameter | | |
| | Outer pipe Portion D1 | ID 2.465 in. | 1 to 24 in. |
| | Inner Pipe Portion D2 | ID 1.560 in. | ¾ to 20 in. |
| | Reaction Zone Diameter | | |
| | Outer Pipe Portion D3 | ID 1.870 in. | ¾ to 20 in. |
| | Inner Pipe Portion D4 | ID .995 in. | 0.5 to 18 in. |
| | Total Depth | 1500 ft. | 1000 to 6000 ft. |
| | Depth to Start of Reaction Zone | 1000 ft. | 500 to 4500 ft. |
| | Length of Reaction Zone R | 500 ft. | 500 to 3000 ft. |
| | Temperature at Top of Reaction Zone | 450° F. | 300° to 550° F. |
| | Temperature at Bottom of Reaction Zone | 470° F. | 300° to 650° F. |
| | Pressure at Top of Reaction Zone | 410 psia | 200 to 1930 psia |
| | Pressure at Bottom of Reaction Zone | 650 psia | 433 to 2600 psia |
| 2. | Influent Fluid with Reactants | | |
| | Sewage Sludge Waste Stream | | |
| | C.O.D. | 7600 mg/liter | 0 to 20,000 mg/l |
| | Prressure (surface) | 0 psia | 0 to 200 psia |
| | Temperature | Atmos. Ambient | Atmos. Ambient |
| | Flow rate | About 3 gpm | 0 to 500 gpm |
| | Air | | |
| | Pressure | 100 psia | 0 to 200 psia |

TABLE-continued

|  |  | Example | Range |
|---|---|---|---|
|  | Temperature | Atmos. Ambient | Atmos. Ambient |
|  | Flow Rate | 1.52 cfm | 0 to 500 cfm |
|  | Bubble Velocity | .70 ft/sec | 0.5 to 2.5 ft/sec |
| 3. | Effluent Fluid |  |  |
|  | Pressure | 80 psia | 0 to 200 psia |
|  | Temperature | Atmos. Ambient | Atmos. Ambient |
|  | Flow Rate | About 3 gpm | 0 to 500 gpm |
| 4. | Output |  |  |
|  | Energy Btu/Day | $.67 \times 10^6$ | 0 to $10 \times 10^8$ |
|  | C.O.D. Reduction | 70% | 0 to 99% |
|  | Amount Throughput |  |  |
|  | C.O.D./Day | 112 lb/day | 100 to 100,000 lb/day C.O.D. |
|  | Flow Rate | 3 gpm | 0 to 500 gpm |
|  | Raw Sewage Equivalent* | 72,000 gpd | 45,000 to $64 \times 10^6$ gpd |

*at 1,560 lb/C.O.D. per million gallons of raw sewage

In summary, the method and apparatus of the present invention accomplish a high temperature, high pressure, chemical reaction including the wet oxidation of sewage sludge and other fluid waste but require only low pressure pumping apparatus. Both the initial costs and the operating costs are considerably less than other known methods and apparatus achieving similar end results. In addition, the method and apparatus of the present invention require a minimum of low skill maintenance and produce energy in the form of a high quality steam. The invention achieves essentially a 100% destruction of all living organisms and about 98% reduction in the C.O.D., is odorless, and produces a readily dewaterable ash end product.

Although the present invention has been described with a certain degree of particularity, it is understood that the present disclosure has been made by way of example and that changes in details of structure may be made without departing from the spirit thereof.

What is claimed is:

1. In a method for effecting accelerated chemical reactions between at least two reactants, the steps of:

flowing an influent fluid with at least two reactants downwardly through a downgoing flow passage at a selected flow rate to a selected depth below the ground surface in a subterranean hole to form a hydrostatic column of fluid exerting a pressure and provide a temperature sufficient to cause the reactants at said selected depth to react in a reaction at an accelerated reaction rate and pass further down through a reaction zone extending through said downgoing flow passage a selected distance below said selected depth whereby reaction products are produced and the fluid is heated in said reaction zone, flowing the heated fluid and reaction products from said reaction zone back up to substantially ground surface level in an upgoing flow passage in heat exchange relation to the downflowing fluid as an effluent fluid, said reaction being carried out with said downgoing and upgoing flow passages suspended from above in said subterranean hole and in spaced relation to said hole; and controlling the temperature of said reaction zone by adding heat to said fluid in said reaction zone when the temperature of said fluid in said reaction zone is below a selected temperature and removing heat from said fluid in said reaction zone when said fluid in said reaction zone is above a selected temperature to accomplish a maximum reaction rate with the vapor pressure of the influent fluid at the local temperature being maintained always lower than the local pressure to prevent boiling of said influent fluid.

2. In a method as set forth in claim 1 wherein said effluent fluid is recycled back as a part of said influent fluid to control the concentration of the reactants in the influent fluid.

3. In a method as set forth in claim 1 wherein one of said reactants is a stream of gas introduced under a selected pressure into the influent fluid above and distant from the reaction zone to form a series of enlarged gas bubbles having a generally spherical cap portion, a generally cylindrical main body portion, and a truncated portion opposite said cap portion, said main body portion diverging along a slight curve from said cap portion, said bubbles being carried down through said downgoing flow passage with said influent fluid to said reaction zone.

4. In a method as set forth in claim 3 wherein said gas is an oxidizing agent.

5. In a method as set forth in claim 4 wherein said influent fluid contains dissolved or suspended solids.

6. In a method as set forth in claim 1 wherein one of said reactants is a gas that is introduced above the reaction zone and substantially at the ground surface level.

7. In a method as set forth in claim 6 including the step of controlling the flow rate of the stream of gas introduced into the influent fluid.

8. In a method as set forth in claim 1 wherein one of said reactants is a gas that is introduced at a plurality of selected depth intervals below the ground surface level as successive streams at progressively higher pressures.

9. In a method as set forth in claim 1 wherein the temperature of said influent fluid at substantially the upper limit of said reaction zone is in the range of about 300° F. to 550° F. and the pressure of said influent fluid at substantially the upper limit of said reaction zone is within the range of about 200 psia to 1930 psia.

10. In a method as set forth in claim 1 wherein the temperature of said influent fluid at the bottom of said reaction zone is in the range of about 300° F. to 650° F. and the pressure of the influent fluid at the lower limit of said reaction zone is in the range of about 433 to 2600 psia.

11. In a method as set forth in claim 1 wherein the pressure of the influent fluid at substantially the ground surface level is in the range of about 0 to 200 psia at substantially atmospheric, ambient temperatures with a continuous downflowing and upflowing flow throughput.

12. In a method as set forth in claim 1 wherein the pressure of the effluent fluid is maintained in the range of about 0 to 200 psia.

13. In a method as set forth in claim 1 including the step of controlling the flow rate of the influent fluid at substantially ground surface level.

14. In a method as set forth in claim 1 including the step of controlling the concentration of said reactants in relation to one another and in relation to the amount of liquid content of the influent fluid.

15. In a method as set forth in claim 1 including the step of controlling the pressure and flow rate of the effluent fluid.

16. In a method as set forth in claim 1 wherein said temperature control of the influent fluid includes the step of selectively transferring heat from the reaction zone to the ground surface level and transferring heat from the ground surface level to the reaction zone.

17. In a method as set forth in claim 1 wherein said downgoing and upgoing flow passages are in a concentric arrangement.

18. In a method as set forth in claim 1 wherein said influent fluid is passed down the outer flow passage and up the inner flow passage.

19. In a method as set forth in claim 1 wherein said influent fluid is passed down the inner flow passage and up the outer flow passage.

20. In a method as set forth in claim 1 wherein said effluent fluid is successively recycled back down as influent fluid and up as effluent fluid in a succession of downgoing and upgoing flow passages disposed in a common hole coupled in series for carrying out a succession of chemical reactions on a continuous stream of fluid, the effluent fluid from each successive reactor being passed into a tank open to the atmosphere to remove gaseous reaction products.

21. In a method as set forth in claim 1 including the steps of measuring the pressure at the upper limit of the reaction zone and measuring the temperature of the fluid at selected intervals from the ground surface level throughout the vertical extent of said flow passages.

22. In a method as set forth in claim 1 including the initial step of adding heat to said fluid in said reaction zone to initiate the reaction.

23. In a method as set forth in claim 1 wherein one of said reactants is a stream of gas introduced under a selected pressure into the influent fluid substantially at the ground surface level into said downgoing flow passage to form a series of Taylor-type gas bubbles that are carried down with the influent fluid to cause intense mixing and contacting and maximize the reaction in the reaction zone and reduce pumping requirements.

24. In a method for effecting accelerated chemical reactions between at least two reactants, the steps of:
flowing an influent fluid with a first reactant downwardly through the downgoing flow passage at a selected flow rate to a selected depth below the ground surface to form a hydrostatic column of fluid exerting a pressure sufficient to cause said first reactant and a second reactant at said selected depth to react at an accelerated reaction rate and pass farther down through a reaction zone extending through said downgoing flow passage a selected distance below said selected depth whereby reaction products are produced and the fluid is heated in said reaction zone;
introducing said second reactant in the form of a stream of gas into the influent fluid distant from the reaction zone generally in the area of the ground surface at a selected pressure and flow rate to form a series of Taylor-type gas bubbles that are carried down through said downgoing flow passage with said influent fluid to said reaction zone to chemically react with said first reactant at a substantially more rapid rate than at ground surface temperature and atmospheric pressure; and
flowing the heated fluid and reaction products from said reaction zone back up to substantially ground surface level in an upgoing flow passage in heat exchange relation to the downflowing fluid as an effluent fluid.

25. In a method for effecting accelerated reactions between reactants in a fluid comprising the steps of:
flowing an influent fluid downwardly through a downgoing flow passage to a selected depth below the ground surface to form a hydrostatic column exerting a pressure sufficient to cause an accelerated reaction between selected reactants, introducing a stream of gas into the influent fluid distant from a reaction zone in the area of the ground surface at a selected pressure such that the gas is entrained in said influent fluid to form a series of enlarged bubbles in the fluid, each characterized by a generally cylindrical body portion and a generally spherical cap portion, and is carried downwardly with said influent fluid;
gradually increasing the pressure and temperature on the influent fluid and gas bubbles from substantially ground level down in one of two concentric flow passages with the depth being sufficient to cause reactants in the gas and fluid to chemically react in a reaction zone at a substantially more rapid rate than at ground surface temperatures and atmospheric pressure in an exothermic manner whereby reaction products are produced and the fluid is heated;
flowing the reaction products and heated fluid back up to ground surface level in said other concentric flow passage in heat exchange relation to the downflowing fluid;
controlling the temperature of said reaction zone from controls generally in the area of the ground surface level by adding heat to said fluid in said reaction zone when the temperature of said fluid in said reaction zone is below a selected temperature and removing heat from said fluid in said reaction zone when said fluid in said reaction zone is above a selected temperature, said adding and removing of heat from fluid in said reaction zone being delimited to fluid in said reaction zone, such that the maximum reaction rate is achieved but the vapor pressure of the fluid at the local temperature is always less than the local pressure to prevent a boiling of said influent fluid;
controlling the flow rate and pressure of said influent fluid and said effluent fluid from controls at the ground surface level; and
controlling the concentration of said reactants in relation to one another and in relation to the liquid content of said influent fluid from controls at the ground surface level.

26. In a method of effecting accelerated chemical reactions for use in the wet oxidation of sewage sludge, the steps of:
flowing an influent sewage sludge fluid having a selected C.O.D. at a controlled, selected flow rate and selected pressure downwardly in a downgoing flow passage to a selected depth below the ground surface to form a hydrostatic column of fluid exerting a pressure sufficient to cause combustible materials to burn in the presence of oxygen at an accelerated reaction rate and pass down through the downflowing flow passage through a reaction zone extending a selected distance below said selected depth whereby reaction products are produced and the fluid is heated;

introducing a stream of air with oxygen into the influent fluid at a controlled selected flow rate and pressure in the area of the ground surface so as to produce a series of Taylor-type gas bubbles that travel downwardly with said influent fluid to said reaction zone and rapidly mix the oxygen in the bubbles with the water content to cause a rapid oxidation, followed by flowing the heated fluid and reaction products back up to substantially ground surface level in an upflowing flow passage in heat exchange relation to the downflowing fluid as an effluent fluid; and controlling the temperature of said reaction zone by adding heat to said fluid in said reaction zone when the temperature of said fluid in said reaction zone is below a selected temperature and removing heat from said fluid in said reaction zone when said fluid in said reaction zone is above a selected temperature to accomplish a maximum reaction rate with the vapor pressure of the influent fluid at the local temperature being maintained always lower than the local pressure to prevent boiling of the influent fluid.

27. In a method as set forth in claim 26 wherein said C.O.D. raw sewage equivalent is between 45,000 and 64 × 10$^6$ gallons per day at a flow rate of 0 to 500 gallons per minute.

28. In a method as set forth in claim 26 wherein the temperature of said influent fluid at the top of said reaction zone at which the reaction accelerates at an exponential rate is about 450° F.

29. In a method as set forth in claim 26 wherein said bubble velocity is in the range of 0.5 to 2.5 feet per second for a flow rate in the range of 0 to 500 cubic feet per minute.

30. In a method as set forth in claim 26 wherein said sewage sludge has a chemical oxygen demand in the range of 0 to 20,000 milligrams per liter.

31. In apparatus for effecting accelerated chemical reactions, the combination comprising:

a reactor including first and second pipe portions defining a downgoing flow passage and an upgoing flow passage in heat exchange relation to the downgoing flow passage, said reactor being suspended from above in a subterranean hole and in spaced relation to said hole, said downgoing flow passage extending from substantially the ground surface to a depth sufficient to cause a downflowing fluid therein to form a hydrostatic column of fluid to exert a pressure and provide a temperature sufficient to cause two reactants in the fluid at said selected depth to react at an accelerated rate, said downgoing flow passage extending down from said selected depth to form a reaction zone whereby reaction products are produced and said fluid is heated in said reaction zone;

means for pumping an influent fluid with at least two reactants from substantially the ground surface level through said downgoing and upgoing passages whereby an effluent fluid with reaction products is passed from said reactor; and means for controlling the temperature of said reaction zone by adding heat to said fluid in said reaction zone when the temperature of said fluid in said reaction zone is below a selected temperature and removing heat from said fluid in said reaction zone when said fluid in said reaction zone is above a selected temperature to maintain a substantially maximum reaction rate without boiling of the fluid in said reaction zone.

32. In apparatus as set forth in claim 31 wherein said first and second pipe portions are arranged with one in concentric spaced relation within the other with the outer pipe portion being closed at the bottom forming a hydraulic flow-through U-tube.

33. In apparatus as set forth in claim 31 wherein said first and second pipe portions are supported in a depending manner from a common support plate substantially at the ground surface level.

34. In apparatus as set forth in claim 31 wherein said pipe portions are reduced in size at a selected depth below the ground surface substantially at the upper limit of the reaction zone to maintain a substantially constant velocity through said pipe portions.

35. In apparatus as set forth in claim 31 wherein each of said inner and outer pipe portions is made up of lengths of stainless steel pipe sections of a selected internal diameter, the inner pipe sections being welded end-to-end and the outer pipe sections being connected end-to-end by tapered, threaded pipe couplings.

36. In apparatus set forth in claim 35 wherein each of said inner and outer pipe portions has an instepped coupling connecting an upper larger diameter pipe section to a lower smaller diameter pipe section located a selected distance below the ground surface to reduce the size of said flow passages.

37. In apparatus as set forth in claim 36 wherein each of said instepped couplings is in the form of a stainless steel body machined with a smooth, curved, inner conveying surface to prevent plugging.

38. In apparatus as set forth in claim 31 including pumping means in the area of the ground surface level for flowing the fluid through said upgoing and downgoing flow passages in a continuous throughput flow.

39. In apparatus as set forth in claim 31 wherein said means for controlling the temperature of said reaction zone includes a temperature transfer member along said reaction zone and coupling means extending from said transfer member to the ground surface level to selectively add heat to and remove heat from said transfer member.

40. In apparatus as set forth in claim 39 including flexible clamping means at spaced intervals along said outer pipe portion for supporting said flow lines providing for movement of said flow lines for expansion and contraction due to temperature changes, each of said flow lines having a rigid pipe section and a flexible pipe section to allow for expansion and contraction due to temperature changes.

41. In apparatus as set forth in claim 39 wherein said transfer member is in the form of a jacket with an inner annular passage surrounding and in heat exchange relation to the outer of said pipe portions and a pair of flow lines extending up to the ground surface level, and further including a tank, a pump, a heat exchanger, a control valve, and a heat source in the area of the ground surface level coupled in a fluid flow circuit with said jacket and flow lines for heating and pumping a heated fluid into said jacket in one mode of operation and for pumping heated fluid from the jacket through said heat exchanger in another mode of operation to control the temperature of the fluid in said reaction zone.

42. In apparatus as set forth in claim 41 including means coupled to said heat exchanger for converting heat energy to mechanical energy.

43. In apparatus as set forth in claim 39 including a bottom end cap for said jacket offset to one side of said jacket with a flow line coupled to said bottom end cap.

44. In apparatus as set forth in claim 31 including means for measuring the pressure at the upper limit of said reaction zone.

45. In apparatus as set forth in claim 31 including means for measuring the temperature of the fluid at selected elevations below the ground surface level including at the upper limit of said reaction zone.

46. In apparatus as set forth in claim 31 including means for introducing a stream of gas under a selected pressure into the downgoing flow passage in the area of the ground surface level to form enlarged gas bubbles commonly known as Taylor bubbles, characterized by a generally cylindrical main body portion, a generally spherical cap portion, and a truncated portion opposite said cap, that are pumped down with the influent fluid.

47. In apparatus as set forth in claim 46 including a plurality of inlets for said stream of gas located at spaced selected distances below the ground surface level.

48. In apparatus as set forth in claim 46 wherein said means for introducing a stream of gas includes a terminal pipe section in the downgoing flow passage arranged longitudinally of the passage with an outlet opening toward the downstream end of said downgoing flow passage.

49. In apparatus as set forth in claim 31 including a valve-controlled flow line coupled between the outlet of the upgoing flow passage and the inlet of the downgoing flow passage to selectively recycle a portion of the effluent fluid back down as influent fluid to provide a selected blend for said influent fluid.

50. In apparatus as set forth in claim 31 including a plurality of reactors disposed side-by-side in a single well casing, said reactors being flow-coupled in a series relationship with the influent fluid passed into one of said reactors and the effluent fluid from said one reactor into the next reactor to successively recycle the fluid back down for further reaction for carrying out a succession of chemical reactions on a continuous stream of fluid.

51. In apparatus as set forth in claim 31 wherein said reactor is disposed in a well casing having grout outside the well casing with a grout plug closing and sealing the bottom of the casing.

52. In apparatus as set forth in claim 51 including heat insulation between the inside of the well casing and the outside of said outer pipe portion in the area of the reaction zone to inhibit a reflux condensing action of moisture in said casing.

53. In apparatus as set forth in claim 31 wherein one of said pipe portions is suspended from a support plate and has a first extension above the ground surface level with a first top flange, the other of said pipe portions having a second extension in spaced concentric relation to said first extension with a second top flange supported on said first top flange whereby said other pipe portion is supported in a suspended manner from said first pipe portion.

54. In apparatus as set forth in claim 31 wherein said reactor is disposed in a subterranean hole separate from said reactor.

55. In apparatus as set forth in claim 54 wherein said reactor is in spaced concentric relation to said hole.

56. In apparatus as set forth in claim 31 wherein said means for controlling the temperature of said reaction zone includes fluid conductor means extending away from said reactor and up from said reaction zone for passing a fluid of a selected temperature in heat exchange relation to said reaction zone.

57. In apparatus as set forth in claim 56 wherein said fluid conductor means are fluid flow lines, and further including means for controlling the flow rate and direction of fluid flow in said fluid flow lines.

58. In apparatus as set forth in claim 31 wherein said means for controlling the temperature of said reaction zone includes a jacket with an inner annular passage surrounding and in heat exchange relation to said reaction zone, said jacket extending substantially only along said reaction zone.

59. In apparatus as set forth in claim 31 wherein said means for controlling the temperature of said reaction zone includes a jacket with an inner annular passage surrounding and in heat exchange relation to the outer of said pipe portions through which a fluid is pumped for selectively heating and cooling said reaction zone and further includes a pair of flow lines coupled to the top and bottom portions, respectively, of said jacket and extending up to the ground surface level to circulate a fluid to and from said jacket to the ground surface level.

60. In apparatus for effecting direct wet oxidation of combustible materials in a stream of sewage sludge and like stream of waste materials, the combination comprising:
  a reactor extending from ground surface down into the earth into a hole including an outer pipe portion and an inner pipe portion in spaced concentric relation with the outer pipe portion defining an outer flow passage between the outer and inner pipe portions and an inner flow passage in the inner pipe portion, said outer pipe portion having a closure at the lower end and said inner pipe portion terminating above said cap closure to form a hydraulic U-tube through which fluids flow from the ground surface down to the ea..h and back up in a continuous flow, one of said flow passages through which downflowing fluid is passed extending to a depth sufficient to cause a downflowing fluid therein to form a hydrostatic column of fluid to exert a pressure sufficient to cause two reactants in the fluid at said selected depth to react at an accelerated rate, said one flow passage extending down from said selected depth to a further selected depth to form a reaction zone whereby heat is released to heat said fluid and reaction products are produced in said reaction zone;
  means for flowing a sewage sludge fluid from substantially the ground surface down through one of said flow passages at a controlled flow rate and selected pressure;
  means for adding a diluent fluid to said sewage sludge fluid at a controlled flow rate and selected pressure to achieve a blend of influent fluid having a selected C.O.D.;

means for adding a stream of gas to said influent fluid at substantially ground surface at a selected controlled flow rate and a selected controlled pressure through an outlet facing the downstream end of the passage carrying the downflowing fluid to form a train of Taylor-type gas bubbles in the influent fluid that are carried downwardly in said one flow passage, whereby in the reaction zone the oxygen carried in the bubbles causes a rapid oxidation to burn the combustible materials, produce reaction products, and heat the fluid, and said pumping means moves said reaction products and heated fluid back up through said other flow passage with heat being transferred to said downflowing fluid to reduce the temperature of said upflowing fluid; and means for controlling the temperature of said reaction zone by adding heat to said fluid in said reaction zone when the temperature of said fluid in said reaction zone is below a selected temperature and removing heat from said fluid in said reaction zone to maintain a maximum reaction rate without boiling of the fluid in the reaction zone.

61. In apparatus as set forth in claim 60 including a settling tank coupled between an outlet for effluent fluid for removing ash with purified fluid from said settling tank being recycled back as influent diluent fluid to said reactor.

62. In apparatus as set forth in claim 60 wherein said reactor extends into the earth to a depth in the range of about 1000 to 6000 feet.

* * * * *